(12) United States Patent
Zhang

(10) Patent No.: US 11,343,644 B2
(45) Date of Patent: May 24, 2022

(54) NEIGHBOR AWARENESS METHOD, BEACON DEVICE, AND MOBILE TERMINAL

(71) Applicant: Huawei Technologies Co., Ltd., Shenzhen (CN)

(72) Inventor: Xiaoping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 16/473,832

(22) PCT Filed: Dec. 27, 2016

(86) PCT No.: PCT/CN2016/112473
§ 371 (c)(1),
(2) Date: Jun. 26, 2019

(87) PCT Pub. No.: WO2018/119704
PCT Pub. Date: Jul. 5, 2018

(65) Prior Publication Data
US 2019/0342719 A1     Nov. 7, 2019

(51) Int. Cl.
*H04W 4/029*     (2018.01)
*H04W 4/02*      (2018.01)
*H04W 4/23*      (2018.01)

(52) U.S. Cl.
CPC .......... *H04W 4/029* (2018.02); *H04W 4/023* (2013.01); *H04W 4/23* (2018.02)

(58) Field of Classification Search
CPC ............. G06Q 20/4014; G06Q 20/205; H04L 63/0428; H04W 12/02
See application file for complete search history.

(56) References Cited

U.S. PATENT DOCUMENTS

| | | | |
|---|---|---|---|
| 2007/0164863 A1* | 7/2007 | Himberger | G06K 17/0029 340/572.1 |
| 2008/0041947 A1* | 2/2008 | Hollister | G06Q 10/08 235/385 |
| 2014/0302794 A1 | 10/2014 | Palin et al. | |

(Continued)

FOREIGN PATENT DOCUMENTS

| CN | 101741983 B | 8/2013 |
|---|---|---|
| CN | 103975612 A | 8/2014 |

(Continued)

OTHER PUBLICATIONS

Foreign Communication From A Counterpart Application, PCT Application No. PCT/CN2016/112473, English Translation of International Search Report dated Sep. 27, 2017, 2 pages.

(Continued)

*Primary Examiner* — Joshua L Schwartz
(74) *Attorney, Agent, or Firm* — Conley Rose, P.C.

(57) ABSTRACT

A beacon device obtains first location feature information that indicates an environmental condition around a current location of the beacon device; obtains registration location feature information that indicates an environmental condition around an original assembly location of the beacon device; then compares the two pieces of information to perform compliance detection on a location of the beacon device; and determines, based on a detection result, whether to trigger neighbor awareness.

20 Claims, 27 Drawing Sheets

(56) References Cited

U.S. PATENT DOCUMENTS

| 2016/0278012 A1 | 9/2016 | Kawahara et al. |
| 2016/0345173 A1 | 11/2016 | Shirakawa et al. |
| 2017/0269186 A1* | 9/2017 | Sharma .................... G01S 1/70 |
| 2020/0126030 A1* | 4/2020 | Magal .................... B62D 63/08 |

FOREIGN PATENT DOCUMENTS

| CN | 105872256 A | 8/2016 |
| CN | 105940406 A | 9/2016 |
| CN | 105991165 A | 10/2016 |

OTHER PUBLICATIONS

Foreign Communication From A Counterpart Application, PCT Application No. PCT/CN2016/112473, English Translation of Written Opinion dated Sep. 27, 2017, 3 pages.
Machine Translation and Abstract of Chinese Publication No. CN101741983, Aug. 7, 2013, 13 pages.
Machine Translation and Abstract of Chinese Publication No. CN105872256, Aug. 17, 2016, 7 pages.
Foreign Communication From A Counterpart Application, Chinese Application No. 201680075888.2, Chinese Office Action dated Nov. 1, 2019, 15 pages.

\* cited by examiner

NEIGHBOR AWARENESS METHOD, BEACON DEVICE, AND MOBILE TERMINAL

CROSS-REFERENCE TO RELATED APPLICATIONS

This application is a U.S. National Stage of International Patent Application No. PCT/CN2016.112473 filed on Dec. 27, 2016, which is hereby incorporated by reference in its entirety.

TECHNICAL FIELD

Embodiments of this application relate to communications technologies, and in particular, to a neighbor awareness method, a beacon device, and a mobile terminal.

BACKGROUND

A neighbor awareness technology is a technology in which a mobile terminal perceives proximity (Proximity) of the mobile terminal to a beacon (beacon) device, and triggers application based on the proximity.

In the neighbor awareness technology, an adhesively deployed beacon device periodically sends a device identification. After receiving the device identification, the mobile terminal generates proximity information based on the device identification, and then sends the proximity information and the device identification to a server. The server generates push information based on the proximity information and the device identification, and pushes the push information to the mobile terminal for display. The device identification includes parameters of the beacon device such as a universally unique identifier (Universally Unique Identifier, UUID), major (Major) information, minor (Minor) information, and measured power (Measured Power). The UUID, the major, and the minor may be customized by a user, and are used to indicate a device, an enterprise, a location, or the like. For example, when the neighbor awareness technology is applied to commercial information recommendation, the UUID may indicate a store code of a supermarket, the major indicates a floor on which the supermarket is located, the minor indicates a shelf, and the measured power indicates a strength value, at a specific distance, of a signal from the mobile terminal to the beacon device. The server determines, based on the UUID, a building on which a store is located; determines, based on the major, that the beacon device is in a clothing area on a second floor; and determines, based on the minor, that the clothing area is a shirt area for men. When it is determined based on the proximity information, that the user is relatively far away from the shirt area, the generated push information includes simple information of a new shirt for men. If it is determined, based on the proximity information, that the user is approaching the shirt area the push information includes detailed shirt information, a preferential price, and the like.

In the neighbor awareness technology, most beacon devices are adhesively deployed, and are easily moved manually. Consequently, security of the neighbor awareness technology is poor. For example, when a beacon device in a leather shoes area in a shopping mall is moved to a toy area, a mobile terminal in the toy area receives leather shoes recommendation information. Therefore, how to resolve poor security caused by moving a beacon device is actually a problem that needs to be urgently resolved in the industry.

SUMMARY

Embodiments of this application provide a neighbor awareness method, a beacon device, and a mobile terminal. In a neighbor awareness process, compliance detection is performed on a location of a beacon device, to prevent poor security caused by manually moving the beacon device.

According to a first aspect, an embodiment of this application provides a neighbor awareness method. The method is described from a perspective of a beacon device, and the method includes: obtaining, by the beacon device, first location feature information that indicates an environmental condition around a current location of the beacon device; obtaining registration location feature information that indicates an environmental condition around an original assembly location of the beacon device; then comparing the two pieces of location feature information to perform compliance detection on a location of the beacon device; and determining, based on a detection result, whether to trigger neighbor awareness.

In the foregoing method, the beacon device is prevented from being manually moved by associating neighbor awareness with location detection, thereby improving security of the beacon device.

In a feasible design, the beacon device specifically obtains the registration location feature information based on a registration location feature table, where the registration location feature table stores a correspondence between an identification of the beacon device and the registration location feature information.

By using the foregoing method, the beacon device obtains the registration location feature information based on the registration location feature table.

In a feasible design, when comparing the first location feature information with the registration location feature information, the beacon device calculates a first degree of matching between the two pieces of location feature information, and determines, based on a relationship between the first matching degree and a first threshold, whether to trigger neighbor awareness.

By using the foregoing method, the beacon device is prevented from being manually moved.

In a feasible design, if the first matching degree is greater than or equal to the first threshold, it indicates that the beacon device is not moved.

In a feasible design, an environmental condition around the beacon device continually changes. Therefore, to ensure that the registration location feature information stored in the registration location feature table is latest, the beacon device adds a registration label to a broadcast message when the beacon device is not moved. The registration label is used to update the registration location feature information.

By using the foregoing method, the registration location feature information is updated.

In a feasible design, the environmental condition includes environmental data and/or a radio signal. The environmental data, also referred to as a sensing signal feature includes signal parameters such as an image, a geomagnetic field, barometric pressure, temperature and humidity, and sound and light. The radio signal includes signal strength, a time of flight, a distance, an angle, a cell identifier (Cell ID), a channel parameter, and the like.

According to a second aspect, an embodiment of this application provides a neighbor awareness method. The method is described from a perspective of a mobile terminal. In the method, the mobile terminal obtains first location feature information that indicates an environmental condition around a current location of a beacon device; obtains registration location feature information that indicates an environmental condition around an original assembly location of the beacon device; then compares the two pieces of location feature information to perform compliance detection on a location of the beacon device; and determines, based on a detection result, whether to trigger neighbor awareness.

By using the foregoing method, the beacon device is prevented from being manually moved by associating neighbor awareness with location compliance detection, thereby improving security of the mobile terminal.

In a feasible design, the mobile terminal specifically obtains the registration location feature information based on a registration location feature table, where the registration location feature table stores a correspondence between an identification of the beacon device and the registration location feature information.

By using the foregoing method, the mobile terminal obtains the registration location feature information based on the registration location feature table.

In a feasible design, the registration location feature table is stored on the local mobile terminal, or the registration location feature table is stored on a server. Before obtaining the registration location feature information based on the registration location feature table, the mobile terminal may communicate with the server to receive the registration location feature table.

By using the foregoing method, the mobile terminal obtains the registration location feature table.

In a feasible design, the comparing, by the mobile terminal, the first location feature information with the registration location feature information to determine whether to trigger neighbor awareness includes: comparing, by the mobile terminal, a first degree of matching between the first location feature information and the registration location feature information; and when the first matching degree is greater than or equal to a first threshold, triggering, by the mobile terminal, neighbor awareness; or when the first matching degree is less than a first threshold, forbidding, by the mobile terminal, neighbor awareness.

By using the foregoing method, if the beacon device is moved, the current first location feature information and the registration location feature information of the beacon device cannot match, and the mobile terminal forbids neighbor awareness, so that a risk caused by moving the beacon device can be avoided.

In a feasible design, before comparing the first location feature information with the registration location feature information to determine whether to trigger neighbor awareness, the mobile terminal further collects second location feature information, where the second location feature information indicates an environmental condition around a current location of the mobile terminal. When the second location feature information is collected, the mobile terminal compares the first degree of matching between the first location feature information and the registration location feature information, and compares a second degree of matching between the second location feature information and the registration location feature information. If the first matching degree is greater than or equal to the first threshold, and the second matching degree is greater than or equal to a second threshold, the mobile terminal triggers neighbor awareness; or if the first matching degree is less than the first threshold, and/or the second matching degree is less than a second threshold, the mobile terminal forbids neighbor awareness.

By using the foregoing method, in addition to preventing the beacon device from being moved, information sent by the beacon device can be prevented from being imitated.

In a feasible design, if the first matching degree is greater than or equal to the first threshold, and the second matching degree is greater than or equal to the second threshold, the mobile terminal triggers neighbor awareness; or if the first matching degree is less than the first threshold, and/or the second matching degree is less than the second threshold, the mobile terminal forbids neighbor awareness.

In a feasible design, if the first matching degree is greater than or equal to the first threshold, it indicates that the beacon device is not moved. An environmental condition around the beacon device continually changes. Therefore, to ensure that the registration location feature information stored in the registration location feature table is latest, the beacon device sends a broadcast message including a registration label, and the mobile terminal receives the registration label sent by the beacon device, so that a remote server or the mobile terminal that stores the registration location feature table updates the registration location feature information.

By using the foregoing method, the registration location feature information is updated.

In a feasible design, the obtaining, by the mobile terminal, first location feature information includes: collecting, by the mobile terminal, the first location feature information; or receiving, by the mobile terminal, the first location feature information sent by the beacon device, where the first location feature information is collected by the beacon device.

By using the foregoing method, the mobile terminal obtains the first location feature information.

In a feasible design, the environmental condition includes environmental data and/or a radio signal.

According to a third aspect, an embodiment of this application provides a beacon device, including:

an obtaining module, configured to obtain first location feature information, where the first location feature information indicates an environmental condition around a current location of the beacon device, where the obtaining module is further configured to obtain registration location feature information, where the registration location feature information indicates an environmental condition around an original assembly location of the beacon device; a comparison module, configured to compare the first location feature information with the registration location feature information; and a processing module, configured to determine, based on a comparison result of the comparison module, whether to trigger neighbor awareness.

In a feasible design, the obtaining module is configured to obtain the registration location feature information based on a registration location feature table, where the registration location feature table stores a correspondence between an identification of the beacon device and the registration location feature information.

In a feasible design, the comparison module is specifically configured to compare a first degree of matching between the first location feature information and the registration location feature information; and if the first matching degree is greater than or equal to a first threshold, the processing module triggers neighbor awareness; or if the first matching degree is less than a first threshold, the processing module forbids neighbor awareness.

In a feasible design, the beacon device further includes a transceiver module. When the first matching degree is greater than or equal to the first threshold, the transceiver module sends a broadcast message, where the broadcast message includes a registration label, and the registration label is used to update the registration location feature information.

In a feasible design, the environmental condition includes environmental data and/or a radio signal.

According to a fourth aspect, an embodiment of this application provides a mobile terminal, including:

an obtaining module, configured to obtain first location feature information of a beacon device, where the first location feature information indicates an environmental condition around a current location of the beacon device, where the obtaining module is further configured to obtain registration location feature information of the beacon device, where the registration location feature information indicates an environmental condition around an original assembly location of the beacon device; a comparison module, configured to compare the first location feature information with the registration location feature information; and a processing module, configured to determine, based on a comparison result of the comparison module, whether to trigger neighbor awareness.

In a feasible design, the obtaining module is configured to obtain the registration location feature information based on a registration location feature table, where the registration location feature table stores a correspondence between an identification of the beacon device and the registration location feature information.

In a feasible design, the mobile terminal further includes a storage module, configured to store the registration location feature table.

In a feasible design, the mobile terminal further includes a transceiver module, configured to communicate with a server to receive the registration location feature table.

In a feasible design, the comparison module is configured to compare a first degree of matching between the first location feature information and the registration location feature information; and the processing module is configured to: when the first matching degree is greater than or equal to a first threshold, trigger neighbor awareness; or when the first matching degree is less than a first threshold, forbid neighbor awareness.

In a feasible design, the obtaining module is further configured to obtain second location feature information, where the second location feature information indicates an environmental condition around a current location of the mobile terminal.

In a feasible design, the comparison module is configured to compare the first degree of matching between the first location feature information and the registration location feature information, and compare a second degree of matching between the second location feature information and the registration location feature information; and the processing module is configured to: trigger neighbor awareness when the first matching degree is greater than or equal to the first threshold, and the second matching degree is greater than or equal to a second threshold; or forbid neighbor awareness when the first matching degree is less than the first threshold, and/or the second matching degree is less than a second threshold.

In a feasible design, the mobile terminal further includes the transceiver module, configured to receive a registration label sent by the beacon device, where the registration label is used to update the registration location feature information.

In a feasible design, the mobile terminal further includes the transceiver module, configured to receive the first location feature information sent by the beacon device, where the first location feature information is collected by the beacon device.

In a feasible design, the environmental condition includes environmental data and/or a radio signal.

According to a fifth aspect, an embodiment of this application provides a beacon device, including a processor, a memory, a communications interface, and a system bus, where the memory and the communications interface are connected to and communicate with the processor by using the system bus, the memory is configured to store a computer execution instruction, the communications interface is configured to communicate with another device, and the processor is configured to run the computer execution instruction, so that the beacon device performs all steps of the foregoing method applied to the beacon device.

According to a sixth aspect, an embodiment of this application provides a mobile terminal, including a processor, a memory, a communications interface, and a system bus, where the memory and the communications interface are connected to and communicate with the processor by using the system bus, the memory is configured to store a computer execution instruction, the communications interface is configured to communicate with another device, and the processor is configured to run the computer execution instruction, so that the mobile terminal performs all steps of the foregoing method applied to the mobile terminal.

According to a seventh aspect, an embodiment of this application provides a computer storage medium, configured to store a computer software instruction used by the foregoing beacon device, where the computer software instruction includes a program designed for performing the first aspect or all feasible implementations of the first aspect.

According to an eighth aspect, an embodiment of this application provides a computer storage medium, configured to store a computer software instruction used by the foregoing mobile terminal, where the computer software instruction includes a program designed for performing the second aspect or all feasible implementations of the second aspect.

According to a ninth aspect, an embodiment of this application provides a chip system, including at least one processor, a memory, an input/output part, and a bus, where the at least one processor obtains an instruction in the memory by using the bus, so as to implement a designed function of the mobile terminal in the foregoing method.

According to a tenth aspect, an embodiment of this application provides a chip system, including at least one processor, a memory, an input/output part, and a bus, where the at least one processor obtains an instruction in the memory by using the bus, so as to implement a designed function of the beacon device in the foregoing method.

According to the neighbor awareness method, the beacon device, and the mobile terminal provided in the embodiments of this application, the first location feature information that indicates the environmental condition around the current location of the beacon device is obtained; the registration location feature information that indicates the environmental condition around the original assembly location of the beacon device is obtained; then the two pieces of information are compared to perform compliance detection on the location of the beacon device; and it is determined, based on the detection result, whether to trigger neighbor awareness. Therefore, neighbor awareness is associated with location compliance detection, and the beacon device is prevented from being manually moved, thereby improving security of the beacon device.

BRIEF DESCRIPTION OF DRAWINGS

FIG. 11A-1 to FIG. 11A-5 are a flowchart of neighbor awareness performed when a beacon device is a Bluetooth beacon in a neighbor awareness method according to this application;

FIG. 11B-1 and FIG. 11B-2 are a software flowchart in which a beacon device is a Bluetooth beacon in a neighbor awareness method according to this application;

FIG. 12A-1, FIG. 12A-2, FIG. 12A-3, and FIG. 12A-4 are a flowchart of neighbor awareness performed when a beacon device is a WiFi AP beacon device in a neighbor awareness method according to this application;

FIG. 12B-1 and FIG. 12B-2 are a software flowchart in which a beacon device is a WiFi AP beacon device in a neighbor awareness method according to this application;

DESCRIPTION OF EMBODIMENTS

The following describes the embodiments of this application with reference to accompanying drawings.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
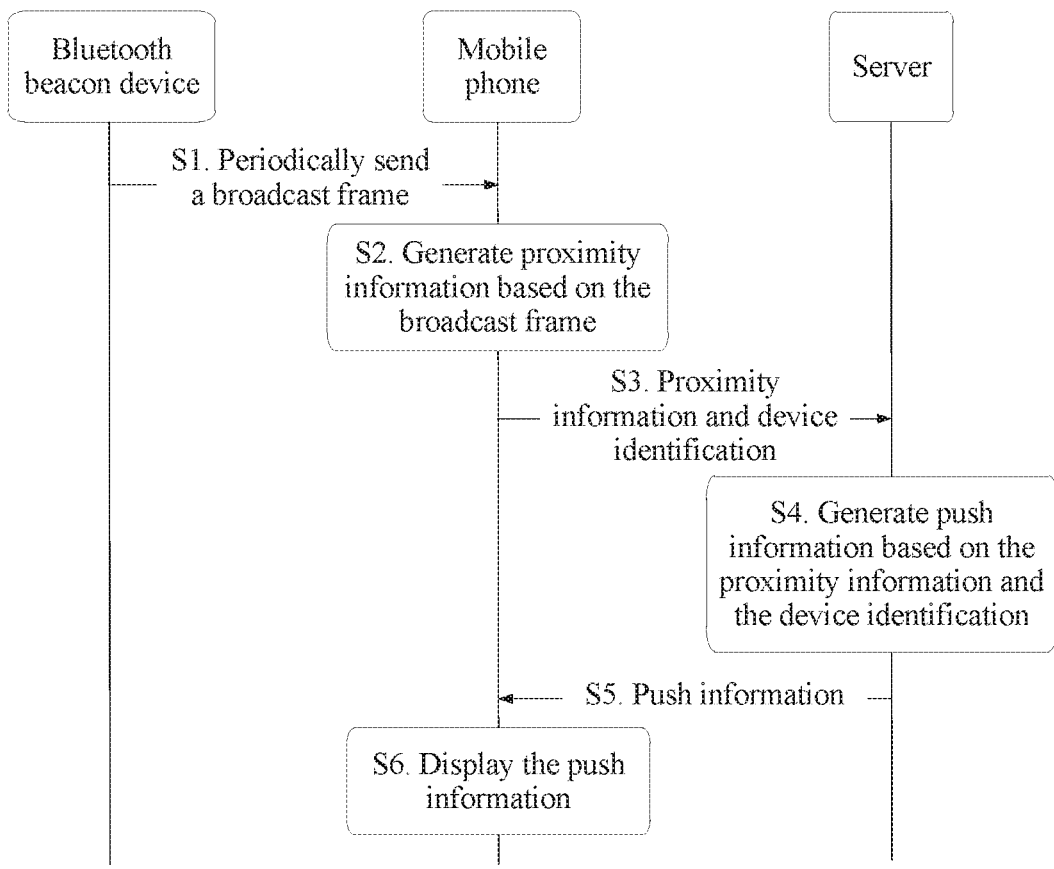
FIG. 1 is a principle diagram of neighbor awareness of a Bluetooth beacon device.

A neighbor awareness technology is a technology in which a mobile terminal perceives proximity (Proximity) of the mobile terminal to a beacon (beacon) device, and triggers application based on the proximity, so as to implement functions such as information pushing, indoor micro-positioning, punch-in, payment, and device discovery. A merchant may voluntarily install a beacon device because the neighbor awareness technology has low costs, thereby greatly facilitating a consumer and a supplier. Therefore, the neighbor awareness technology has been widely applied since the technology is launched. FIG. 1 is a principle diagram of neighbor awareness of a Bluetooth beacon device.

Referring to FIG. 1, a beacon device is specifically a Bluetooth beacon, and a mobile terminal is specifically a mobile phone. A neighbor awareness process includes the following steps.

S1. The Bluetooth beacon periodically sends a broadcast frame.

The broadcast frame includes parameters used to indicate a device identity of the Bluetooth beacon, such as a universally unique identifier (UUID), major (Major) information, minor (Minor) information, and measured power (Measured Power).

S2. The mobile phone generates proximity information based on the broadcast frame.

After receiving the broadcast frame sent by the Bluetooth beacon, the mobile phone generates the proximity information. The proximity information is usually measured by using a strength value, at a specific distance, of a signal from the mobile terminal to the beacon device. For example, the proximity is represented by using a received signal strength indicator (Received Signal Strength Indication, RRSI).

S3. The mobile phone sends the proximity information and a device identification to a server.

In this step, the mobile phone sends the generated proximity information and the device identification in the received broadcast frame to the server.

S4. The server generates push information based on the proximity information and the device identification.

In this step, the server retrieves a local database based on the device identification, to find push content corresponding to the device identification, and generates the push information based on the proximity information.

S5. The server sends the push information to the mobile phone.

S6. The mobile phone displays the push information.

In the neighbor awareness technology, most beacon devices are adhesively deployed, and are easily moved to another location manually. Consequently, security of the neighbor awareness technology is poor. For example, when a beacon device in a leather shoes area in a shopping mall is moved to a toy area, a mobile terminal of a user in the toy area receives leather shoes push information. Therefore, how to resolve poor security caused by manually moving a beacon device is actually a problem that needs to be urgently resolved in the industry.

In view of this, the embodiments of this application provide a neighbor awareness method, a beacon device, and a mobile terminal. In a neighbor awareness process, compliance detection is performed on a location of a beacon device, so as to prevent poor security caused by manually moving the beacon device.

The technology described in this specification may be applied to various communications systems in which various types of terminals exist, for example, a global system for mobile communications (Global System for Mobile communications, GSM), a Code Division Multiple Access (Code Division Multiple Access, CDMA) system, a Time Division Multiple Access (Time Division Multiple Access, TDMA) system, a Wideband Code Division Multiple Access (Wideband Code Division Multiple Access Wireless, WCDMA) system, a Frequency Division Multiple Access (Frequency Division Multiple Addressing, FDMA) system, an orthogonal frequency division multiple access (Orthogonal Frequency-Division Multiple Access, OFDMA) system, a general packet radio service (General Packet Radio Service, GPRS) system, a Long Term Evolution (Long Term Evolution, LTE) system, a 5G mobile communications system, and another communications system of this type.

A beacon device in the embodiments of this application is specifically a Bluetooth beacon device, a wireless access point (WiFi AP) beacon device, or the like, and may send information to a mobile terminal through broadcasting or connection.

A mobile terminal in the embodiments of this application may be a portable, pocket-sized, handheld, or computer built-in, or in-vehicle mobile terminal, which exchanges a language and/or data with a radio access network. For example, the mobile terminal may be a device such as a personal communications service (Personal Communications Service, PCS) phone, a cordless telephone set, a Session Initiation Protocol (SIP) phone, a wireless local loop (Wireless Local Loop, WLL) station, a personal digital assistant (Personal Digital Assistant, PDA), or a mobile phone.

The neighbor awareness method described in the embodiments of this application may be classified into three scenarios: a scenario 1 in which a beacon device independently performs the neighbor awareness method, a scenario 2 in which a mobile terminal performs the neighbor awareness method, and a scenario 3 in which a beacon device, a mobile terminal, and a database of a remote server interact with each other to perform the neighbor awareness method. The scenarios are separately described below.

Scenario 1

Figure 2A:
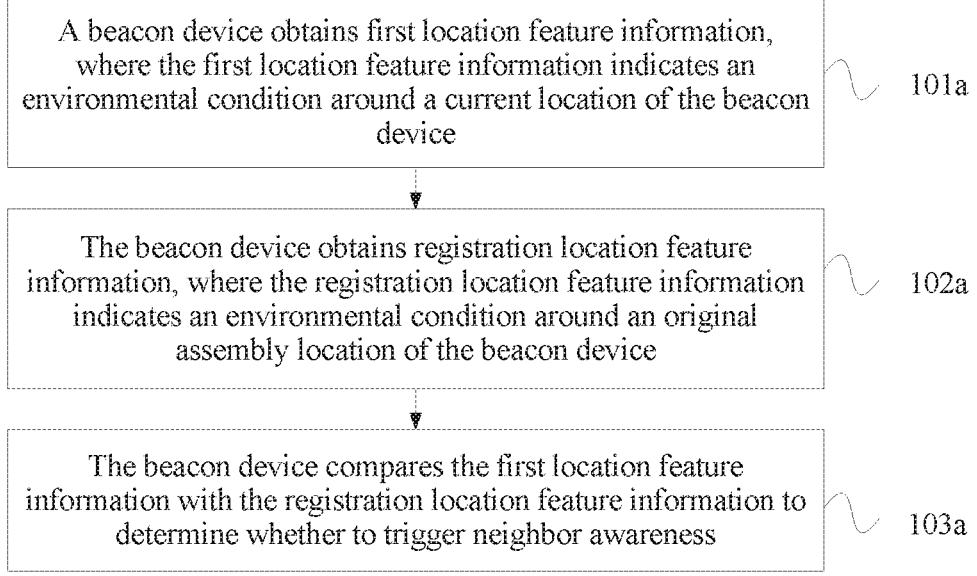
FIG. 2A is a flowchart of Embodiment 1 of a neighbor awareness method according to this application.

FIG. 2A is a flowchart of Embodiment 1 of a neighbor awareness method according to this application. The method includes the following steps.

101a. A beacon device obtains first location feature information, where the first location feature information indicates an environmental condition around a current location of the beacon device.

In a neighbor awareness process, the beacon device collects, based on the current location, the first location feature information that indicates the environmental condition around the current location of the beacon device.

102a. The beacon device obtains registration location feature information, where the registration location feature information indicates an environmental condition around an original assembly location of the beacon device.

In this step, the beacon device obtains the registration location feature information from a database. The registration location feature information is information that is collected based on the original assembly location of the beacon and that is associated with a device identification of the beacon device. For example, a registration location feature table is stored in a local database of the beacon device, the registration location feature table stores an association relationship between the device identification of the beacon device and the registration location feature information, and the beacon device determines the registration location feature information based on the registration location feature table in the local database. For another example, a registration location feature table is stored in a database of a remote server, and the beacon device interacts and communicates with the remote server to obtain the registration location feature information.

103a. The beacon device compares the first location feature information with the registration location feature information to determine whether to trigger neighbor awareness.

After obtaining the first location feature information and the registration location feature information, the beacon device compares the two pieces of information to perform compliance detection on a location of the beacon device, and determines, based on a detection result, whether to trigger neighbor awareness. Therefore, neighbor awareness is associated with location compliance.

According to the neighbor awareness method provided in this embodiment of this application, the beacon device obtains the first location feature information that indicates the environmental condition around the current location of the beacon device; obtains the registration location feature information that indicates the environmental condition around the original assembly location of the beacon device; then compares the two pieces of information to perform compliance detection on the location of the beacon device; and determines, based on the detection result, whether to trigger neighbor awareness. Therefore, neighbor awareness is associated with location compliance, and the beacon device is prevented from being manually moved, thereby improving security of the beacon device.

Optionally, in an embodiment of this application, that the beacon device compares the first location feature information with the registration location feature information to determine whether to trigger neighbor awareness includes: comparing, by the beacon device, whether a first degree of matching between the first location feature information and the registration location feature information is greater than a first threshold; and if the first matching degree is greater than or equal to the first threshold, triggering, by the beacon device, neighbor awareness; or if the first matching degree is less than the first threshold, forbidding, by the beacon device, neighbor awareness.

Specifically, when comparing the first location feature information with the registration location feature information, the beacon device calculates a degree of matching between the two pieces of information (referred to as the first matching degree below), and determines, based on the first matching degree, whether to trigger neighbor awareness. If neighbor awareness is triggered, the beacon device retrieves the local database based on the device identification, to find push content corresponding to the device identification, generates push information, and pushes the push information to a mobile terminal; or if neighbor awareness is not triggered, the beacon device does not generate push information. In addition, the beacon device may further send the device identification to the remote server, and the remote server generates the push information and pushes the push information to the mobile terminal.

In the foregoing method, the beacon device determines, based on the first degree of matching between the first location feature information and the registration location feature information, whether to trigger neighbor awareness.

Further, if the first matching degree is greater than or equal to the first threshold, the beacon device adds a registration label to a broadcast message. The registration label is used to update the registration location feature information.

Specifically, if the first matching degree is greater than or equal to the first threshold, it indicates that the beacon device is not moved. An environmental condition around the beacon device continually changes. Therefore, to ensure that the registration location feature information stored in the registration location feature table is latest, the beacon device sends the broadcast message including the registration label, so that the remote server or the like that stores the registration location feature table updates the registration location feature information.

In the foregoing method, the registration location feature information is updated.

Optionally, in an embodiment of this application, the environmental condition includes environmental data and/or a radio signal.

Specifically, due to error and achievability problems, location feature information is not collected by using a simple positioning technology in this embodiment of this application. If no special description is provided below, the location feature information is generally the first location feature information, the registration location feature information, or second location feature information, in a scenario 2, that indicates an environmental condition around a current location of the mobile terminal. For example, a global positioning system (Global Locationing System, GPS) is not used because the GPS is not available in an indoor environment. For another example, a common base station positioning manner is not used because base station positioning has an excessively large error.

To precisely obtain the location feature information, in this embodiment of this application, all physical environment parameters whose values vary with geographic locations may be used as the location feature information, and the location feature information is obtained by performing feature extraction on the environmental condition. The environmental condition mainly includes two types: the environmental data and the radio signal. The radio signal includes signal strength, a time of flight, a distance, an angle, a cell identifier (Cell ID), a channel parameter, and the like. The environmental data, also referred to as a sensing signal feature, includes signal parameters such as an image, a geomagnetic field, barometric pressure, temperature and humidity, and sound and light. Usually, signal strength of a specific access point (Access Point, AP), an ambient image photographed by a camera, a geomagnetic field signal, barometric pressure at different heights, sound and light signals in a factory workshop, and the like all may be used as the location feature information, and different locations usually have different location feature information. For example, when the location feature information is obtained by using a radio signal parameter, the location feature information may be a received signal strength indicator of at least one of a plurality of APs. For another example, when the beacon device is a beacon device of an integrated camera, the location feature information may be obtained based on an ambient image photographed by the camera. For still another example, the location feature information may be obtained based on the geomagnetic field signal such as strength or a direction because the geomagnetic field signal is used for indoor positioning. For still another example, different heights are corresponding to different barometric pressure values, and an integrated temperature and humidity sensor may obtain a height through inverse calculation, and therefore the location feature information may be obtained based on barometric pressure and a height. For still another example, a specific place such as a factory may have all special sound and light signals, and therefore the location feature information may be obtained based on spectrum features of the sound and light signals in the specific place. An example in which the location feature information is specifically obtained by photographing an ambient environment by using a camera is used below to describe in detail in step 103a, how the beacon device compares the first location feature information with the registration location feature information to determine whether to trigger neighbor awareness.

Specifically, the beacon device is a beacon device of an integrated camera. When the beacon device is initially installed, an environment around an initial assembly location is photographed to obtain an initial picture, and feature extraction is performed on the initial picture to obtain the registration location feature information. In the neighbor awareness process, the beacon device photographs an environment around the current location by using the camera, to obtain a current picture, and performs feature extraction on the current picture to obtain the first location feature information. Then the beacon device compares the first location feature information with the registration location feature information to obtain the first matching degree. The first matching degree may be a similarity between the two pieces of location feature information. For example, the first threshold is 0.8. If the first matching degree is greater than or equal to 0.8, it indicates that the current picture is relatively similar to the initial picture, and neighbor awareness is triggered; or if the first matching degree is less than 0.8, it indicates that the current picture is not similar to the initial picture, and neighbor awareness is not triggered.

In another example, when the location feature information determined based on the environmental condition are longitude coordinates and latitude coordinates, the first matching degree may be a linear distance between the longitude coordinates and latitude coordinates, and the first threshold is optional one meter.

It may be understood that the foregoing descriptions of the first matching degree and the first threshold are merely an example, and a person skilled in the art may select, based on different location feature information, a matching degree and a threshold that adapt to the location feature information.

Figure 3:
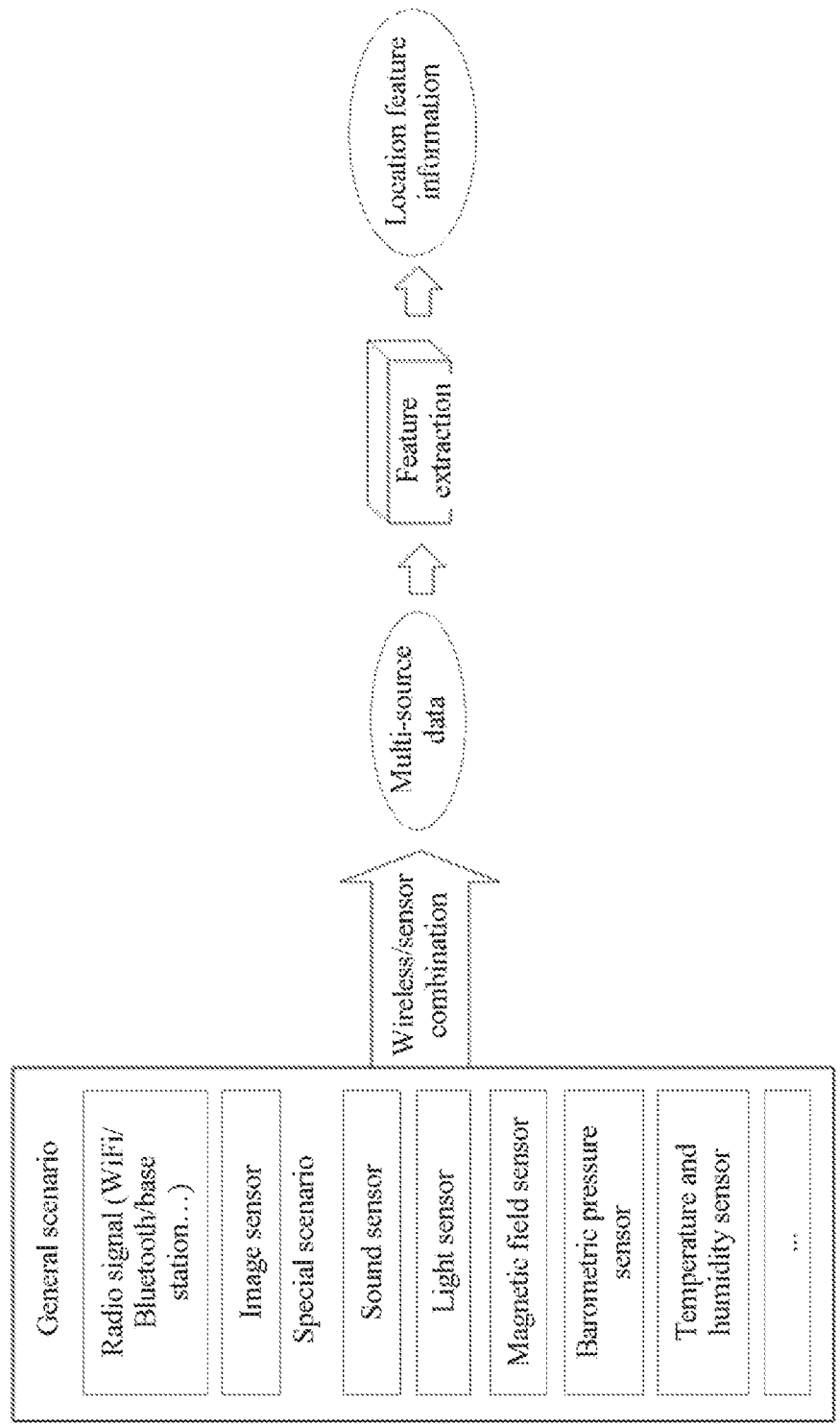
FIG. 3 is a schematic diagram of a location feature information extraction process in a neighbor awareness method according to this application.

In this embodiment of this application, different types of location feature information may be separately used, or may be used in combination. For example, WiFi signal strength may be combined with a parameter such as sound, a geomagnetic field, or barometric pressure to represent the location feature information. In addition, source data of some signals is relatively rough, and the location feature information needs to be obtained by extracting a signal feature by a feature extraction module. For details, refer to FIG. 3. FIG. 3 is a schematic diagram of a location feature information extraction process in a neighbor awareness method according to this application.

Referring to FIG. 3, in a general scenario, the environmental condition includes a WiFi radio signal, a Bluetooth radio signal, a radio signal sent by a base station, an infrared ray and an ultrasonic wave emitted by an image sensor, an image signal collected by the image sensor, and the like. In a special scenario, the environmental condition includes signals emitted or collected by various sensors, and the various sensors include a sound sensor, a light sensor, a magnetic field sensor, a barometric pressure sensor, a temperature and humidity sensor, and the like. At least one of the radio signal and various sensor signals is collected to obtain multi-source data, noise reduction processing or the like is performed on the multi-source data, and then feature extraction is performed to extract the location feature information.

Scenario 2

Figure 2B:
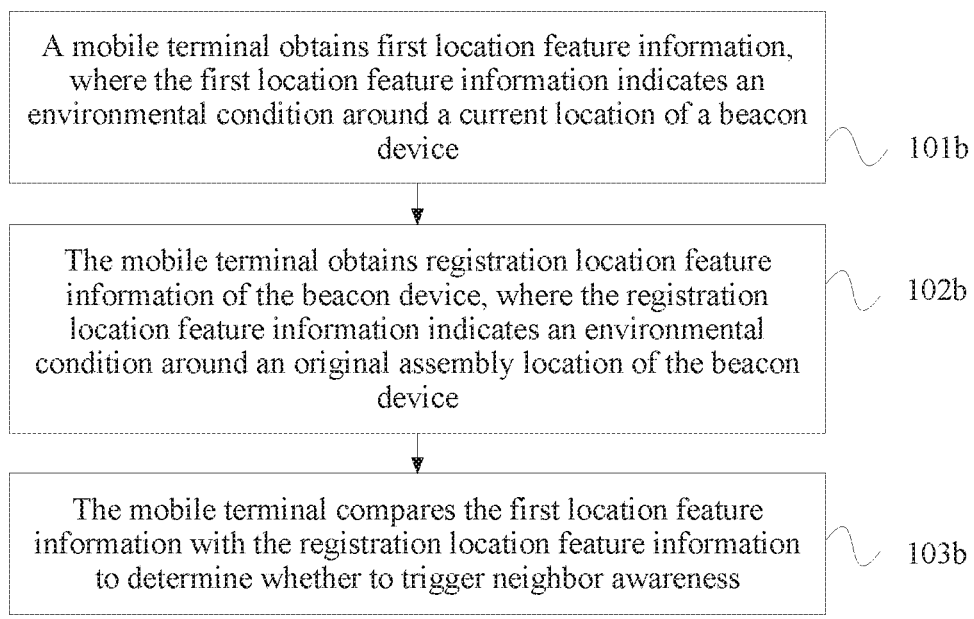
FIG. 2B is a flowchart of Embodiment 2 of a neighbor awareness method according to this application.

FIG. 2B is a flowchart of Embodiment 2 of a neighbor awareness method according to this application. The method includes the following steps.

101b. A mobile terminal obtains first location feature information, where the first location feature information indicates an environmental condition around a current location of a beacon device.

In a neighbor awareness process, the mobile terminal obtains the first location feature information that indicates the environmental condition around the current location of the beacon device. For example, when the mobile terminal is relatively close to a location of the beacon device, the mobile terminal may collect the first location feature information. For another example, the beacon device collects the first location feature information and sends the first location feature information to the mobile terminal, so that the mobile terminal obtains the first location feature information.

102b. The mobile terminal obtains registration location feature information of the beacon device, where the registration location feature information indicates an environmental condition around an original assembly location of the beacon device.

For details, refer to the description of step 102a in FIG. 2A. Details are not repeatedly described herein.

103b. The mobile terminal compares the first location feature information with the registration location feature information to determine whether to trigger neighbor awareness.

For details, refer to the description of step 103a in FIG. 2A. Details are not repeatedly described herein.

According to the neighbor awareness method provided in this embodiment of this application, the mobile terminal obtains the first location feature information that indicates the environmental condition around the current location of the beacon device; obtains the registration location feature information that indicates the environmental condition around the original assembly location of the beacon device; then compares the two pieces of information to perform compliance detection on the location of the beacon device; and determines, based on a detection result, whether to trigger neighbor awareness. Therefore, neighbor awareness is associated with location compliance, and the beacon device is prevented from being manually moved, thereby improving security of the mobile terminal.

Scenario 3

Figure 4:
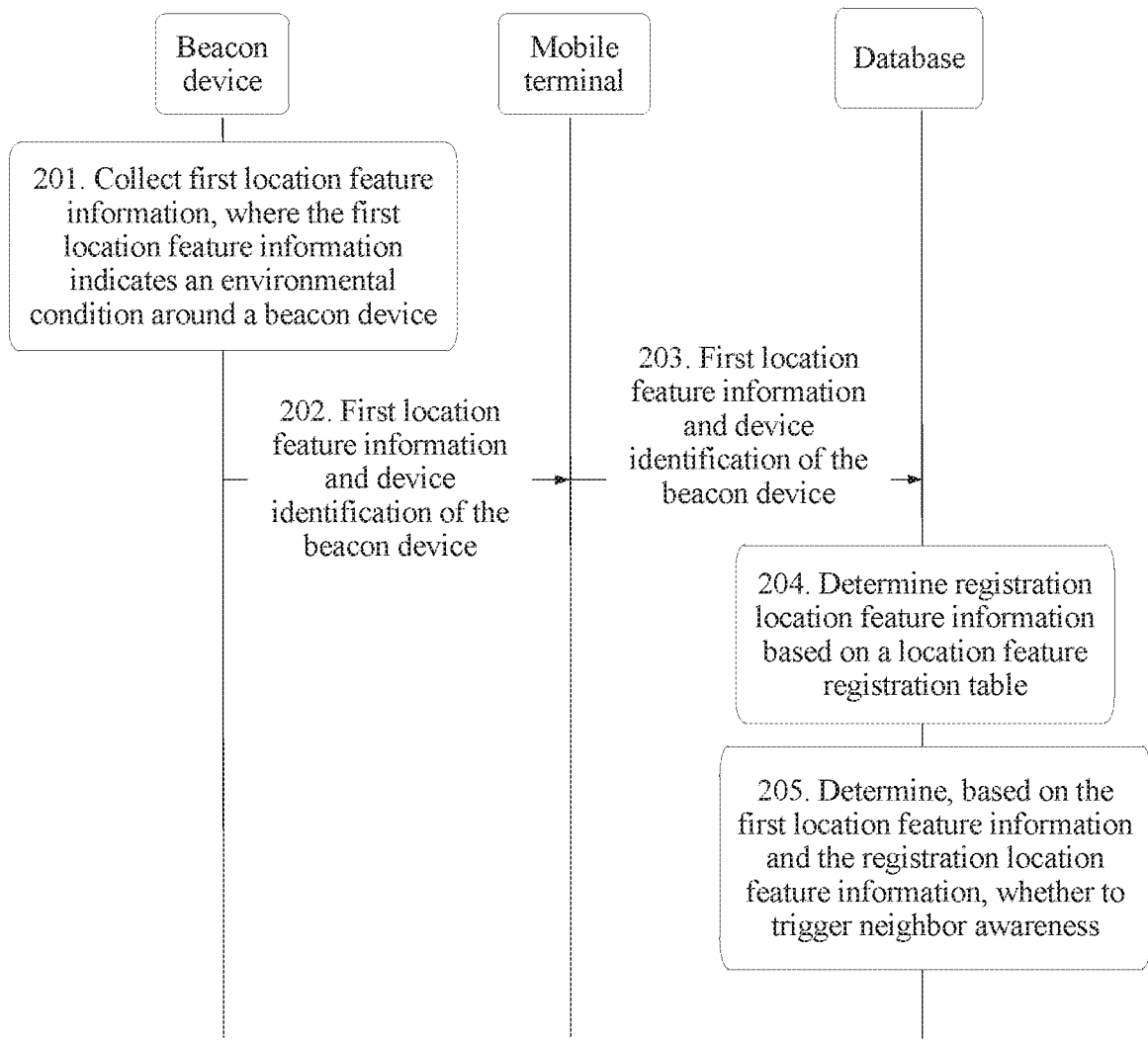
FIG. 4 is a signaling diagram of Embodiment 3 of a neighbor awareness method according to this application.

FIG. 4 is a signaling diagram of Embodiment 3 of a neighbor awareness method according to this application. In this embodiment, the neighbor awareness method in this application is described in detail from a perspective of interaction between a beacon device, a mobile terminal, and a database in a neighbor awareness process. The database is a database of a remote server. This embodiment includes the following steps.

201. The beacon device collects first location feature information, where the first location feature information indicates an environmental condition around the beacon device.

In a neighbor awareness process, the beacon device collects, based on a current location, the first location feature information that indicates the environmental condition around the current location of the beacon device.

202. The beacon device sends the first location feature information and a device identification of the beacon device to the mobile terminal.

After collecting the first location feature information, the beacon device sends the collected first location feature information and the device identification of the beacon device to the mobile terminal. Correspondingly, the mobile terminal receives the first location feature information and the device identification.

203. The mobile terminal sends the first location feature information and the device identification to the database.

In this step, the mobile terminal sends the first location feature information and the device identification of the beacon device to the database. Correspondingly, the database receives the first location feature information and the device identification.

204. The database determines registration location feature information based on a location feature registration table.

In this embodiment of this application, the location feature registration table is pre-stored in the database, and the location feature registration table stores an association relationship between the device identification of the beacon device and a registration location feature. The registration location feature information is information that is collected by the beacon device based on an original assembly location and that is associated with the device identification. To be specific, when the beacon device is initially installed and configured, most original and correct location feature information of the beacon device is established, that is, the association relationship between the registration location feature information and the device identification of the beacon device, and the association relationship is sent to the database by using the mobile terminal, or is directly sent by the beacon device to the database. The database stores the association relationship in the location feature registration table. When there are a plurality of beacon devices, each beacon device is registered with the database. To be specific, when each beacon device is initially installed and configured, the beacon device sends the association relationship between the registration location feature information and the device identification to the database, and the database stores the location feature registration table.

In this step, the database receives the first location feature information and the device identification, and searches the location feature registration table based on the device identification, to find the location feature information established when the beacon device is initially installed and configured, namely, the registration location feature information.

205. The database determines, based on the first location feature information and the registration location feature information, whether to trigger neighbor awareness.

After determining the registration location feature information, the database compares current location feature information, namely, the first location feature information and the registration location feature information; and determines, based on a comparison result, whether to trigger neighbor awareness. If neighbor awareness is triggered, the database finds, based on the device identification, push content corresponding to the device identification, generates push information, and pushes the push information to the mobile terminal; or if neighbor awareness is not triggered, the database does not generate push information. In addition, the database may further send the location feature registration table to the beacon device or the mobile terminal, and the beacon device or the mobile terminal determines whether to trigger neighbor awareness.

It should be noted that in step 202, the mobile terminal may further generate proximity information based on a signal strength value, that is, strength of a signal carrying the first location feature information and the device identification of the beacon device. For example, the proximity information is generated based on an RSSI, and is sent to the database. If the database determines to trigger neighbor awareness in step 205, the database needs to further consider the proximity information when generating the push information. For example, if the proximity information indicates that the mobile terminal is relatively far away from the beacon device, push information with simple content is generated; or if the proximity information indicates that the mobile terminal is relatively close to the beacon device, push information with detailed content is generated.

According to the neighbor awareness method provided in this embodiment of this application, in the neighbor awareness process, the beacon device collects, based on the current location, the first location feature information that indicates the environmental condition around the beacon device, and sends the first location feature information and the device identification of the beacon device to the mobile terminal. The mobile terminal forwards the first location feature information and the device identification to the database. The database determines the registration location feature information based on the pre-stored location feature registration table, and determines, based on the first location feature information and the registration location feature information, whether to trigger neighbor awareness. In the process, the location feature registration table in the database stores the association relationship between the device identification of the beacon device and the registration location feature, and the registration location feature information is information that is collected by the beacon device based on the original assembly location and that is associated with the device identification. Therefore, when determining, based on the first location feature information and the registration location feature information, whether to trigger neighbor awareness, the database associates neighbor awareness with location compliance of the beacon device to verify the location compliance of the beacon device, thereby avoiding poor security caused by manually moving the beacon device.

The foregoing neighbor awareness method is described below in detail from several aspects.

First, the beacon device is prevented from being moved.

To verify the location compliance of the beacon device by associating neighbor awareness with the location compliance of the beacon device, the beacon device needs to collect the first location feature information and send the first location feature information to the database, so that the database verifies the first location feature information based on the registration location feature information, so as to perform compliance verification on the current location of the beacon device. Therefore, before performing neighbor awareness, the beacon device first needs to perform location feature registration. To be specific, when the beacon device is installed for the first time, the beacon device collects the registration location feature information, and sends the identification of the beacon device and the registration location feature information to the mobile terminal. Further, the mobile terminal sends the device identification and the registration location feature information to the database, so that the database generates the location feature registration table. Alternatively, the beacon device directly sends the device identification and the registration location feature information to the database, so that the database generates the registration location feature table.

It may be understood that the device identification and the registration location feature information may also be stored on the local beacon device, or may be stored on the mobile terminal.

For location feature collection, refer to related descriptions in the foregoing scenario 1. Details are not repeatedly described herein.

In this embodiment of this application, in a location feature registration process, that is, when the beacon device is initially installed and configured, the beacon device collects environmental data and/or a radio signal around the beacon device during initial installation and configuration, and extracts the registration location feature information based on the environmental data and/or the radio signal. The registration location feature information is the environmental data, the radio signal, or the like around the beacon device when the beacon device is initially assembled, and is a group of feature data mutually mapped to a location at which the beacon device is initially assembled. The feature data is not affected by an environment and achievability, and even has an error close to zero in some cases. Therefore, in this embodiment of this application, the data, obtained during initial installation and configuration of the beacon device, that reflects an ambient environmental feature of the beacon device and that has a mapping relationship with the location of the beacon device is used as the registration location feature information. The registration location feature information is obtained and is registered with the database, so that the beacon device collects and sends the current first location feature information to the database in a subsequent neighbor awareness process. Therefore, the database verifies the first location feature information based on the registration location feature information, so as to perform compliance verification on the current location of the beacon device.

Figure 5:
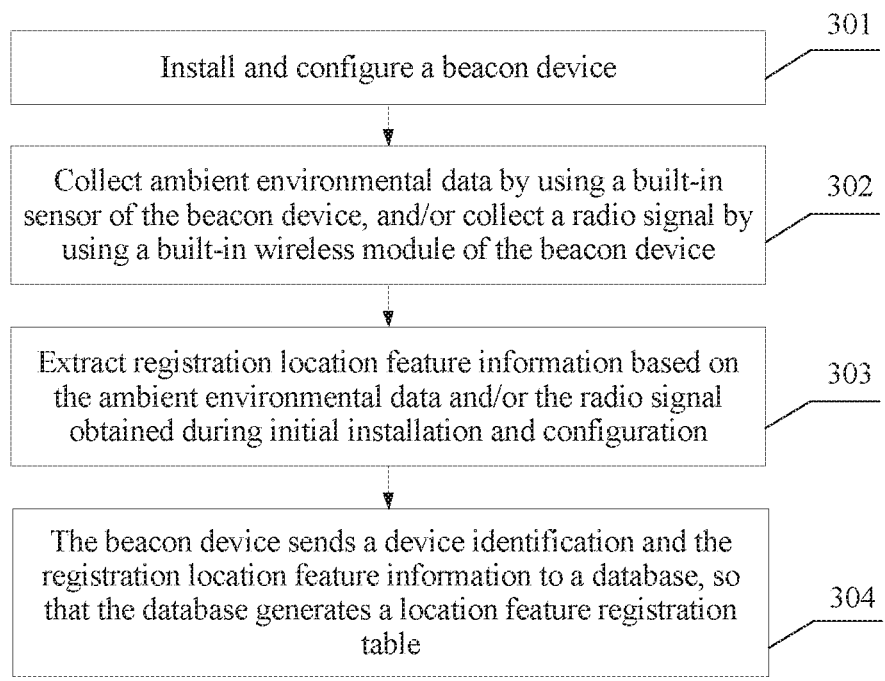
FIG. 5 is a flowchart of location feature registration in a neighbor awareness method according to this application.
Figure 6:
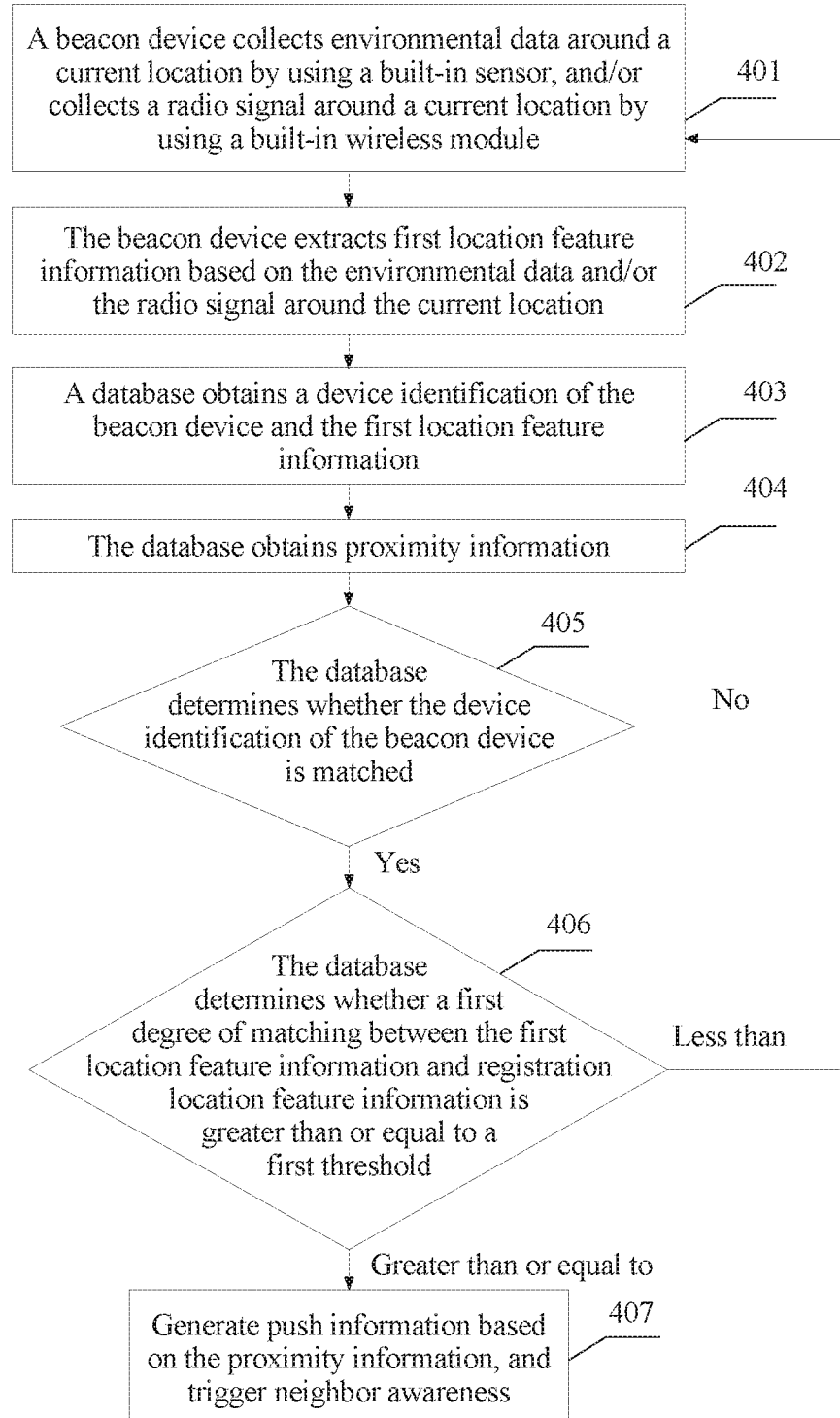
FIG. 6 is a flowchart of a neighbor awareness process according to this application.

The foregoing location registration process and neighbor awareness process are described below in detail. For details, refer to FIG. 5 and FIG. 6. FIG. 5 is a flowchart of location feature registration in a neighbor awareness method according to this application, and FIG. 6 is a flowchart of a neighbor awareness process according to this application.

Referring to FIG. 5, this embodiment includes the following steps:

301. Install and configure a beacon device.

302. Collect ambient environmental data by using a built-in sensor of the beacon device, and/or collect a radio signal by using a built-in wireless module of the beacon device.

303. Extract registration location feature information based on the ambient environmental data and/or the radio signal obtained during initial installation and configuration.

304. The beacon device sends a device identification and the registration location feature information to a database, so that the database generates a location feature registration table.

Referring to FIG. 6, this embodiment includes the following steps.

401. A beacon device collects environmental data around a current location by using a built-in sensor, and/or collects a radio signal around a current location by using a built-in wireless module.

402. The beacon device extracts first location feature information based on the environmental data and/or the radio signal around the current location.

403. A database obtains a device identification of the beacon device and the first location feature information.

404. The database obtains proximity information.

In steps 403 and 404, the database obtains the device identification of the beacon device and the proximity information based on the device identification and the first location feature information sent by a mobile terminal.

405. The database determines whether the device identification of the beacon device is matched; and performs step 406 if the device identification of the beacon device is matched; or returns to step 401 if the device identification of the beacon device is not matched.

Specifically, the database determines, based on the device identification of the beacon device, whether a location feature registration table includes registration location feature information associated with the device identification; and performs step 406 if the location feature registration table includes the registration location feature information associated with the device identification; or returns to step 401 if the location feature registration table does not include the registration location feature information associated with the device identification.

406. The database determines whether a first degree of matching between the first location feature information and registration location feature information is greater than or equal to a first threshold; and performs step 407 if the first matching degree is greater than or equal to the first threshold; or returns to step 401 if the first matching degree is less than the first threshold.

407. Generate push information based on the proximity information, and trigger neighbor awareness.

In addition, the beacon device is prevented from being imitated.

During neighbor awareness, in addition to preventing the beacon device from being manually and maliciously moved, information sent by the beacon device further needs to be prevented from being imitated, so as to avoid causing an effect equivalent to that caused by moving the beacon device. Usually, when the beacon device is a WiFi beacon device because information sent by the WiFi beacon device includes Media Access Control (Media Access Control, MAC). However when the beacon device is a Bluetooth beacon device, it is easy to imitate the Bluetooth beacon device. During imitation, a parameter value in the information sent by the beacon device may be read through packet capture, and a same parameter is set for another device, so as to imitate the beacon device. For example, information of a beacon device in a company is imitated to a private device, and then punch-in is randomly performed at home by using the private device. Because it is difficult to resolve an imitation problem by simply improving the beacon device, in this embodiment of this application, a problem that a beacon device is imitated is resolved by using the mobile terminal.

Specifically, in a neighbor awareness process, the mobile terminal collects second location feature information, and the second location feature information indicates an environmental condition around the mobile terminal. The mobile terminal sends the second location feature information to the database, so that the database determines, based on the second location feature information and the registration location feature information, whether to trigger neighbor awareness.

Figure 7A:
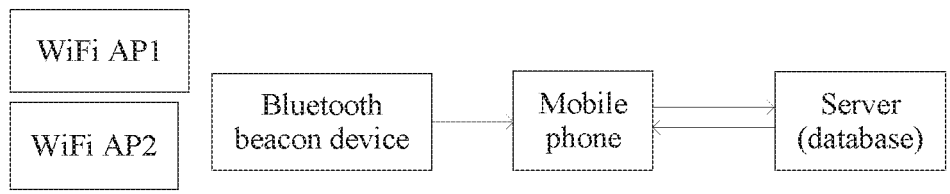
FIG. 7A is a schematic diagram in which a beacon device is not imitated in a neighbor awareness process according to this application.
Figure 7B:
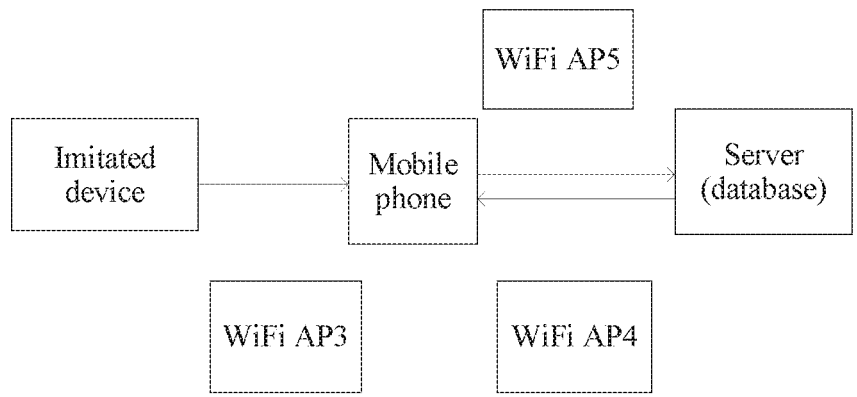
FIG. 7B is a schematic diagram in which a beacon device is imitated in a neighbor awareness process according to this application.

In specific implementation, when the mobile terminal receives the first location feature information, the device identification, and the like sent by the beacon device, the mobile terminal also collects ambient location feature information, namely, the second location feature information, and sends the second location feature information to the database. The database determines whether the first degree of matching between the first location feature information and the registration location feature information is greater than or equal to the first threshold, and determines whether a second degree of matching between the second location feature information and the registration location feature information is greater than or equal to a second threshold. If the first matching degree is greater than or equal to the first threshold, and the second matching degree is greater than or equal to the second threshold, it indicates that there is a relatively high probability that the beacon device is not moved or imitated, and the database triggers neighbor awareness. If the first matching degree is less than the first threshold, it indicates that there is a relatively high probability that the beacon device is moved, and the database does not trigger neighbor awareness. If the first matching degree is greater than or equal to the first threshold, and the second matching degree is less than the second threshold, it indicates that there is a relatively high probability that the beacon device is imitated, and the database does not trigger neighbor awareness. The first threshold and the second threshold may be the same or different. A specific example is used below to describe in detail how to prevent a beacon device from being imitated. For details, refer to FIG. 7A and FIG. 7B. FIG. 7A is a schematic diagram in which a beacon device is not imitated in a neighbor awareness process according to this application, and FIG. 7B is a schematic diagram in which a beacon device is imitated in a neighbor awareness process according to this application.

Referring to FIG. 7A, the beacon device is specifically a Bluetooth beacon device, a mobile terminal is specifically a mobile phone of an employee, and a database is specifically a database of a remote server. The Bluetooth beacon device is disposed in a company, and is surrounded by a WiFi AP1 and a WiFi AP2. When the employee punches in, the employee receives, by using the mobile phone in the company, first location feature information and a device identification sent by the Bluetooth beacon device. The mobile phone collects second location feature information and sends the first location feature information, the second location feature information, and the device identification of the Bluetooth beacon device to the database. The database matches the first location feature information and registration location feature information, and matches the second location feature information and the registration location feature information. Referring to FIG. 7B, when the beacon device is imitated, it is assumed that an imitated device is disposed at the employee's home and is relatively far away from the Bluetooth beacon device. In this case, a WiFi AP3, a WiFi AP4, and a WiFi AP5 are near the mobile phone. The first location feature information successfully matches the registration location feature information, but the second location feature information unsuccessfully matches the registration location feature information. Therefore, the employee can be prevented from punching in by using the imitated Bluetooth beacon device. The registration location feature information may also be referred to as a registered fingerprint or the like.

Next, an energy saving problem of the beacon device is described.

Figure 8:
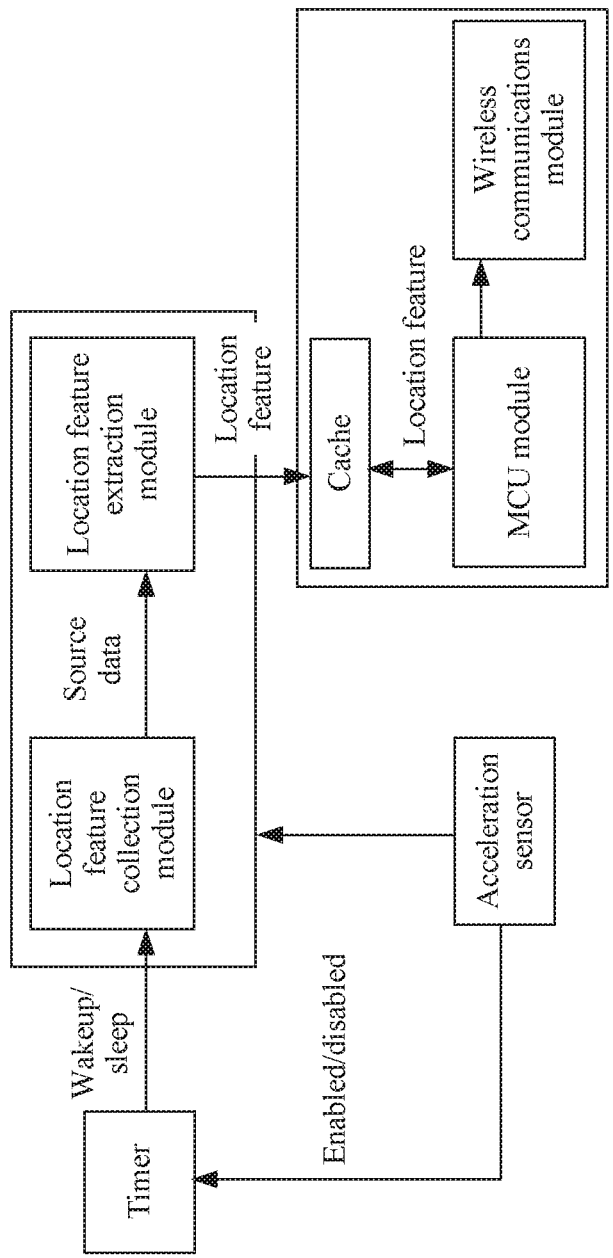
FIG. 8 is a schematic logical diagram of a beacon device that implements energy saving in a neighbor awareness method according to this application.

In this embodiment of this application, an action of collecting location feature information such as the first location feature information or the registration location feature information is added to the beacon device. Consequently, power consumption of the beacon device is increased. Therefore, the energy saving problem needs to be considered for the battery-powered beacon device. In this embodiment of this application, to resolve a conflict between location feature information collection and power consumption of the beacon device, a cache and an acceleration sensor are disposed on the beacon device. When a location feature is collected, for example, collection of the first location feature information is used as an example, in one case, if the beacon device receives indication information that is sent by the acceleration sensor and that indicates that the beacon device is moved, a location obtained after the beacon device is moved is collected and used as the first location feature information; and in another case, if the beacon device is not moved, the beacon device periodically receives the first location feature information because the beacon device does not receive indication information sent by the acceleration sensor. After collecting the first location feature information, the beacon device stores the first location feature information in the cache. When the beacon device needs to send the first location feature information to the mobile terminal, the beacon device sends the first location feature information stored in the cache. For details, refer to FIG. 8. FIG. 8 is a schematic logical diagram of a beacon device that implements energy saving in a neighbor awareness method according to this application.

Referring to FIG. 8, because an ambient physical and radio environments of the beacon device are relatively stable within a specific time, a location feature collection module on the beacon device does not need to continually perform repeated collection. The acceleration sensor (G-sensor) is configured to detect whether the beacon device is moved. When the beacon device is not moved, a timer on the beacon device periodically wakes up the location feature collection module to collect data. A location feature extraction module outputs the first location feature information after processing collected location feature source data, and stores the first location feature information in the cache. Then the location feature collection module and the location feature extraction module enter a sleep state. During a sleep period, each time the beacon device sends the first location feature information, a microcontroller (Micro Controller Unit, MCU) of the beacon device sends the first location feature information in the cache to a wireless communications module, and the wireless communications module sends the first location feature information. When detecting that the beacon device is moved, the G-sensor wakes up the location feature collection module and the location feature extraction module, to continually collect the location feature source data and extract the first location feature information. In this case, the MCU sends the first location feature information extracted in real time to the wireless communications module, and the wireless communications module sends the first location feature information.

Finally, a problem of updating the registration location feature information is described.

Figure 9:
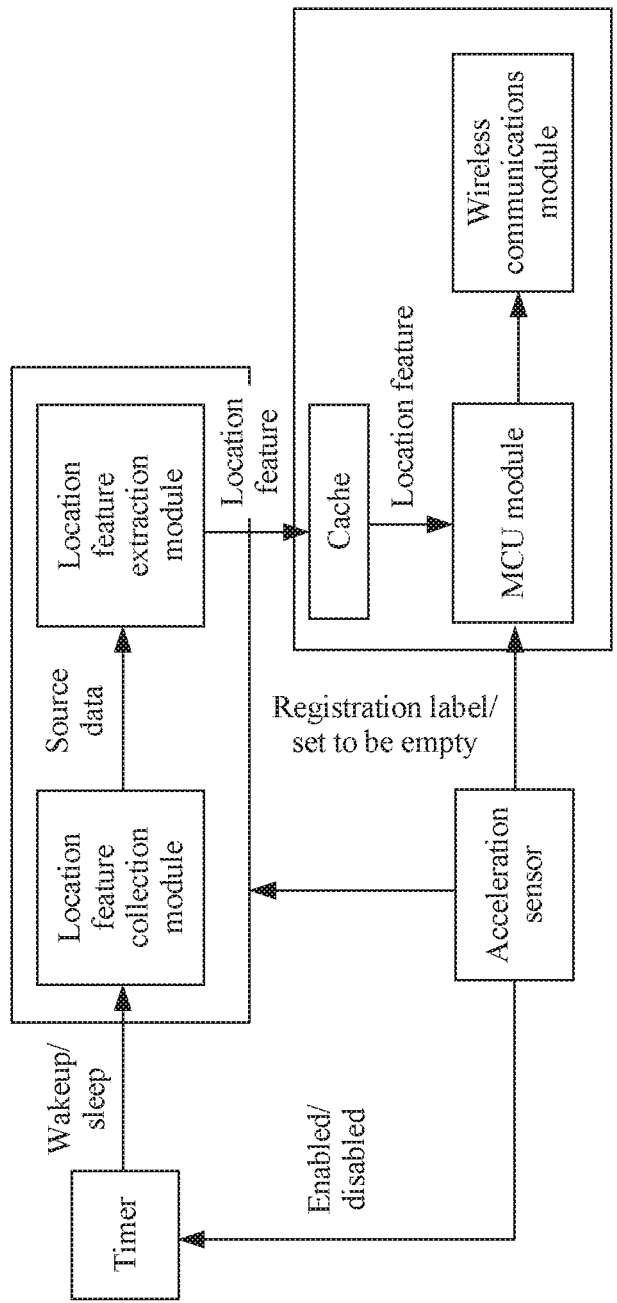
FIG. 9 is a schematic logical diagram of a beacon device that updates a location feature registration table in a neighbor awareness method according to this application.

Usually, the ambient physical and radio environments of the beacon device change over time, and the registration location feature information of the beacon device needs to be periodically updated. In this embodiment of this application, a registration label is introduced to update a registration location feature table. When the beacon device is not moved, the beacon device sends, to the mobile terminal, the device identification and the first location feature information carrying the registration label, so that the mobile terminal sends, to the database, the first location feature information carrying the registration label. Therefore, the database identifies the registration location feature information based on the device identification, and updates the registration location feature information based on the first location feature information. When the beacon device is moved, the beacon device sends, to the mobile terminal, the first location feature information that does not carry the registration label, so that the mobile terminal sends, to the database, the first location feature information that does not carry the registration label, and the database does not update the registration location feature information. For details, refer to FIG. 9. FIG. 9 is a schematic logical diagram of a beacon device that updates a location feature registration table in a neighbor awareness method according to this application.

Referring to FIG. 9, FIG. 9 is a schematic logical diagram shown in this embodiment. Based on FIG. 8, a connection line from the acceleration sensor (G-Sensor) to the MCU module is added. When the G-sensor detects that the beacon device is not moved, the registration label is added to the first location feature information sent to the mobile terminal, and the mobile terminal sends the information to the database. The database updates the registration location feature information, so as to update the location feature registration table. When the G-sensor detects that the beacon device is moved, the registration label is not added to the first location feature information sent to the mobile terminal, that is, the registration label is set to be empty, and the mobile terminal sends the first location feature information to the database. In a neighbor awareness process, the database does not update the registration location feature information based on the first location feature information, but still uses the original registration location feature information to match the first location feature information or the second location feature information.

In addition, the beacon device may broadcast the registration label and the first location feature information. After receiving the registration label, the mobile terminal or the database determines that the beacon device is not moved, and updates the registration location feature table based on the first location feature information.

The beacon device is described below in detail from a perspective of hardware.

Figure 10A:
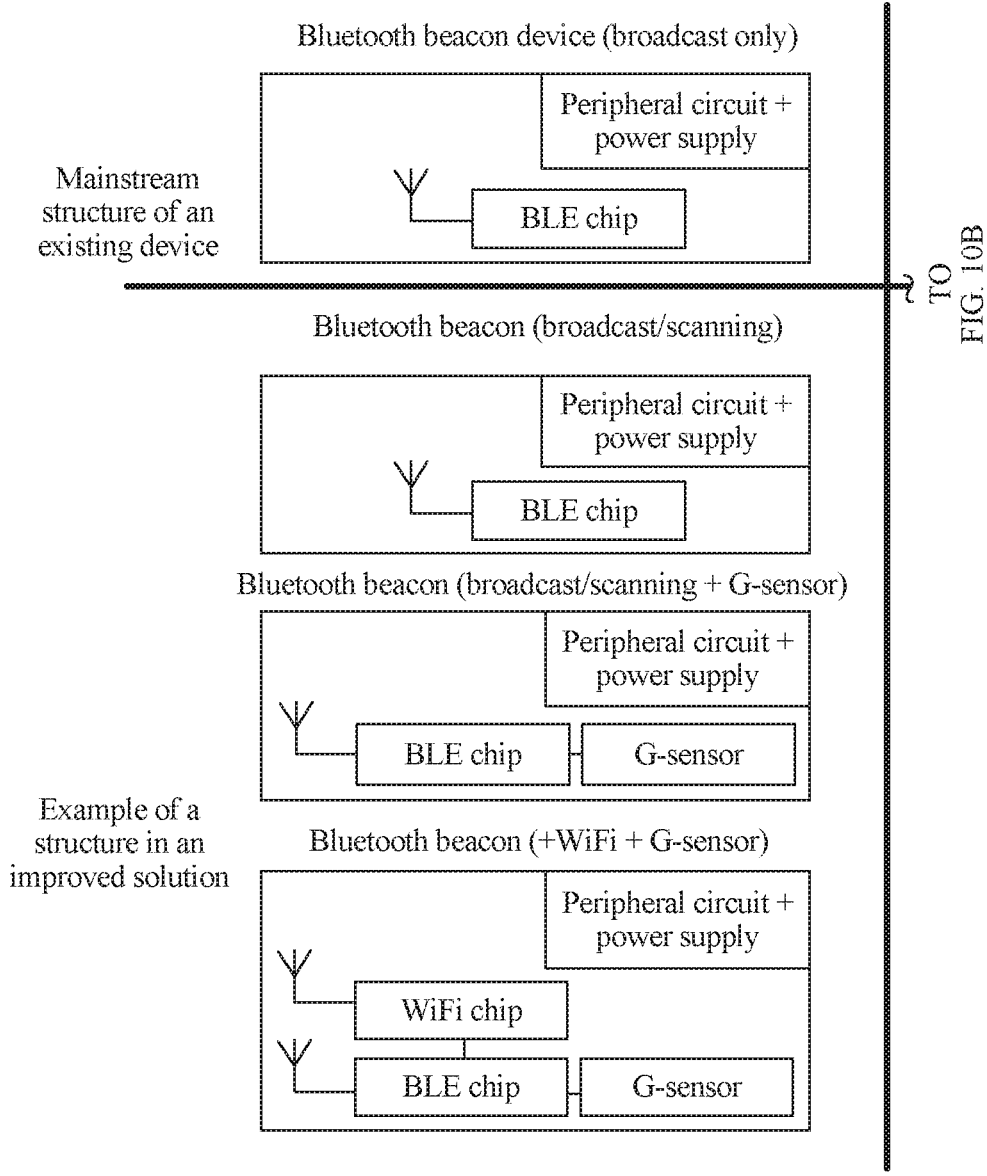
FIG. 10A and FIG. 10B are a schematic diagram of a hardware architecture of a beacon device in a neighbor awareness method according to this application.
Figure 10B:
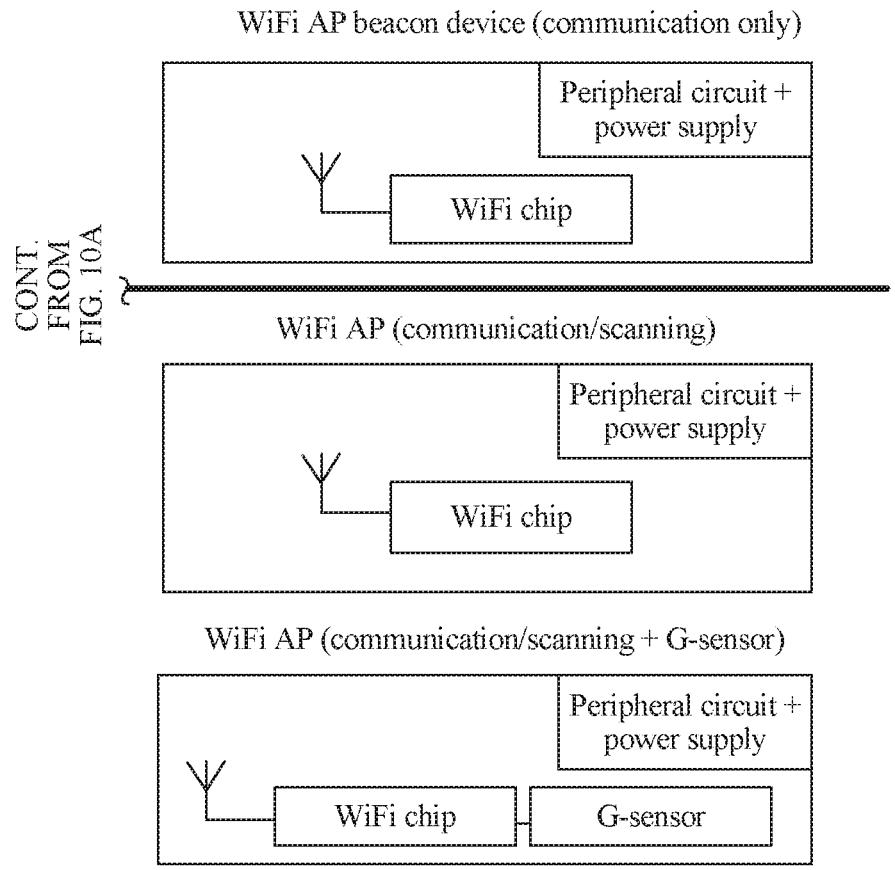

Specifically, referring to FIG. 10A and FIG. 10B, FIG. 10A and FIG. 10B are a schematic diagram of a hardware architecture of a beacon device in a neighbor awareness method according to this application. Referring to FIG. 10A and FIG. 10B, in this embodiment of this application, the beacon device may be a Bluetooth beacon device, a WiFi AP beacon device, a combination of a Bluetooth beacon device and a WiFi AP beacon device, or the like.

In an existing mainstream structure, the Bluetooth beacon includes only a low energy (Bluetooth Low Energy, BLE) chip, a peripheral circuit, and a power supply circuit, and sends only a broadcast frame in a working state. Compared with the Bluetooth beacon in the existing mainstream structure, in this embodiment of this application, the Bluetooth beacon includes the following three architectures. In a first architecture, the Bluetooth beacon still uses the BLE chip, but enables, by modifying chip software, the BLE chip to simultaneously work in a broadcast/scanning state, and collects location feature information in the scanning state, for example, first location feature information and registration location feature information. In a second architecture, considering factors such as power saving and a dynamic change of a radio environment, a G-sensor is added to the BLE chip of the Bluetooth beacon, and the G-sensor detects whether the beacon device is moved. In a third architecture, because currently WiFi APs are more widely deployed than Bluetooth beacons, a WiFi chip may be further connected to the BLE chip in series. The WiFi chip is responsible for scanning an ambient WiFi signal, and uses the ambient WiFi signal as location feature information. The BLE chip works only in the broadcast state, and is responsible for sending a broadcast frame including the location feature information.

In the existing mainstream structure, the WiFi AP beacon device includes only a WiFi chip, a peripheral circuit, and a power supply circuit, and is only configured to communicate with the outside in a working state. Compared with the WiFi AP beacon device in the existing mainstream structure, in this embodiment of this application, the WiFi AP beacon device includes the following two architectures. In a first architecture, the WiFi AP beacon device still uses the WiFi chip, but enables, by modifying chip software, the WiFi chip to simultaneously work in a communication state and a scanning state, and collects location feature information in the scanning state, for example, first location feature information and registration location feature information. The first architecture can implement an anti-movement effect. In a second architecture, a G-sensor is added to the WiFi chip, and the G-sensor detects whether the beacon device is moved.

Figures 1, 11A:
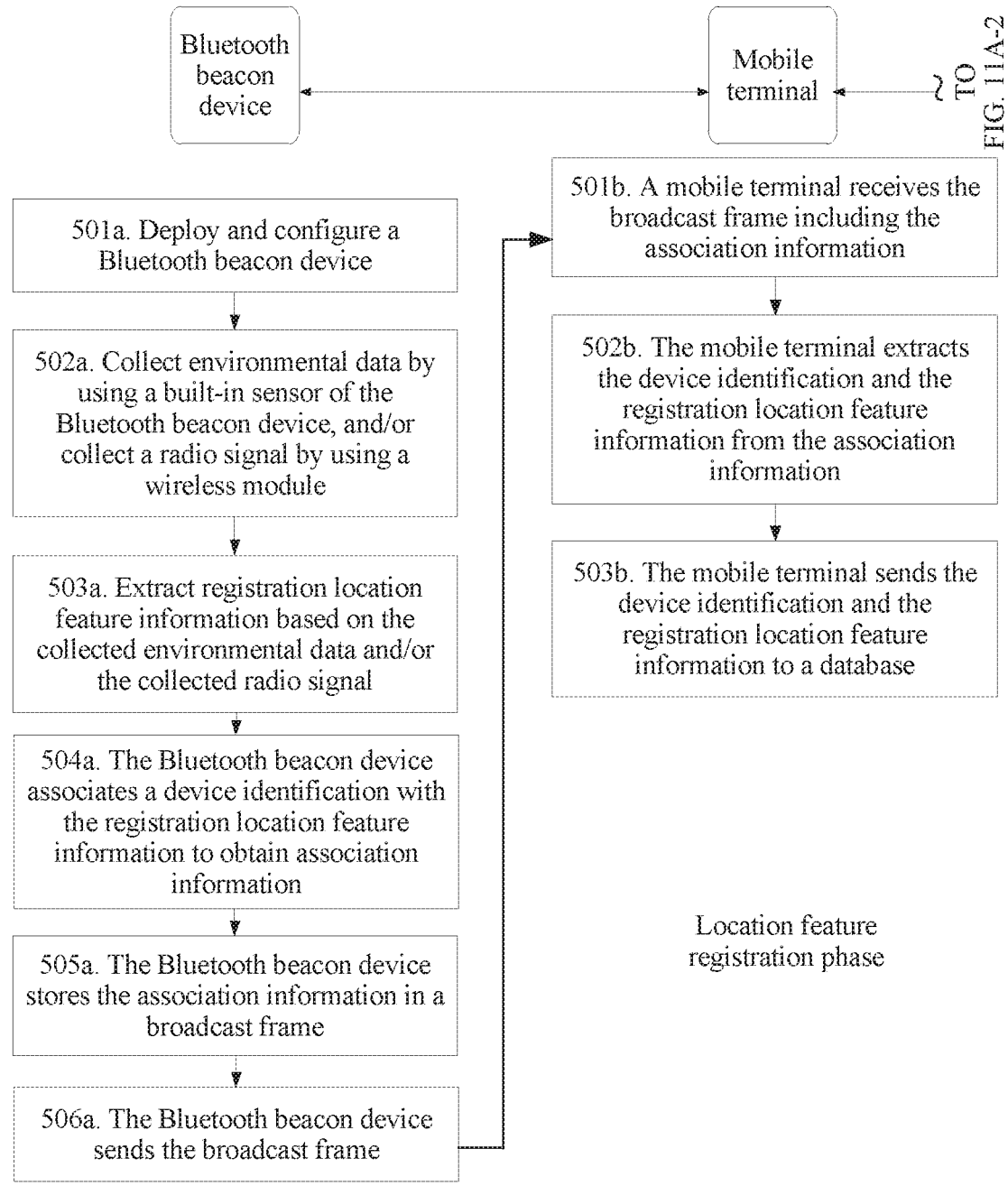
Figures 2, 11A:
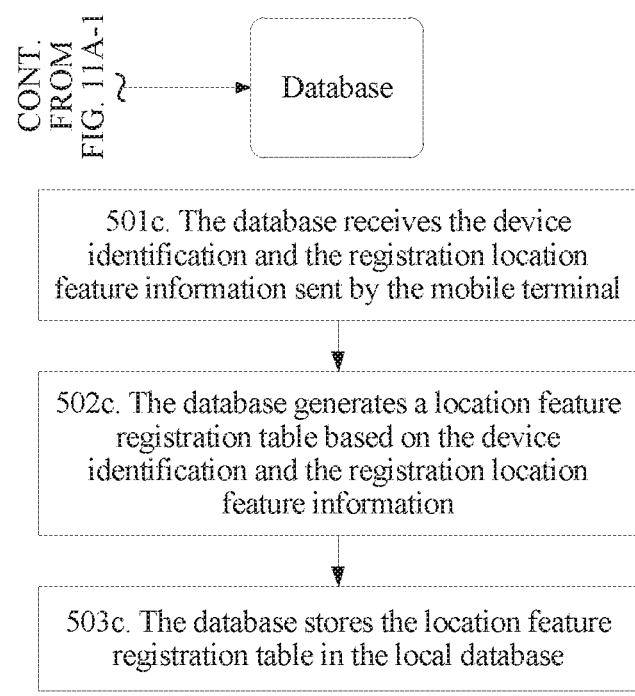
Figures 3, 11A:
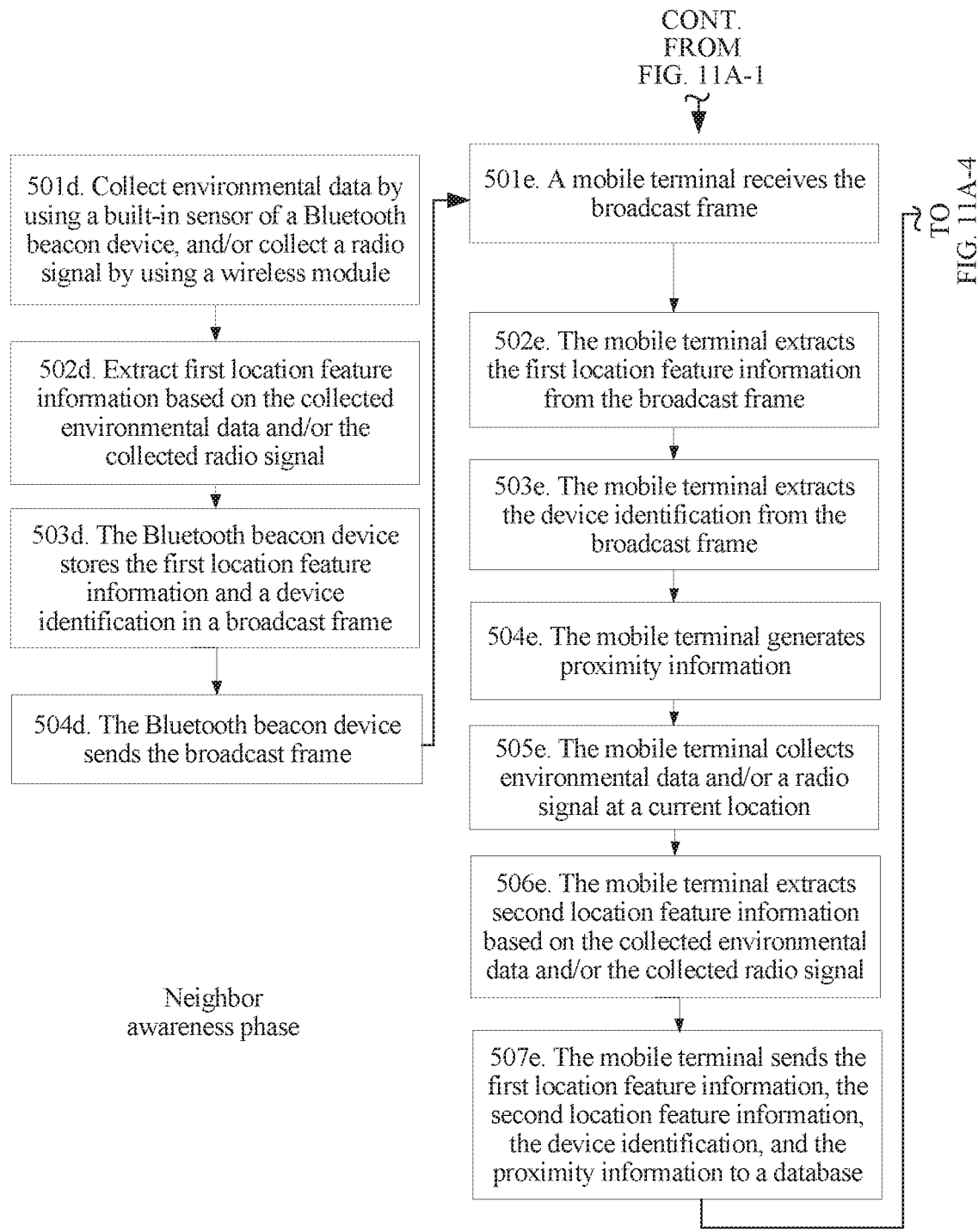
Figures 4, 11A:
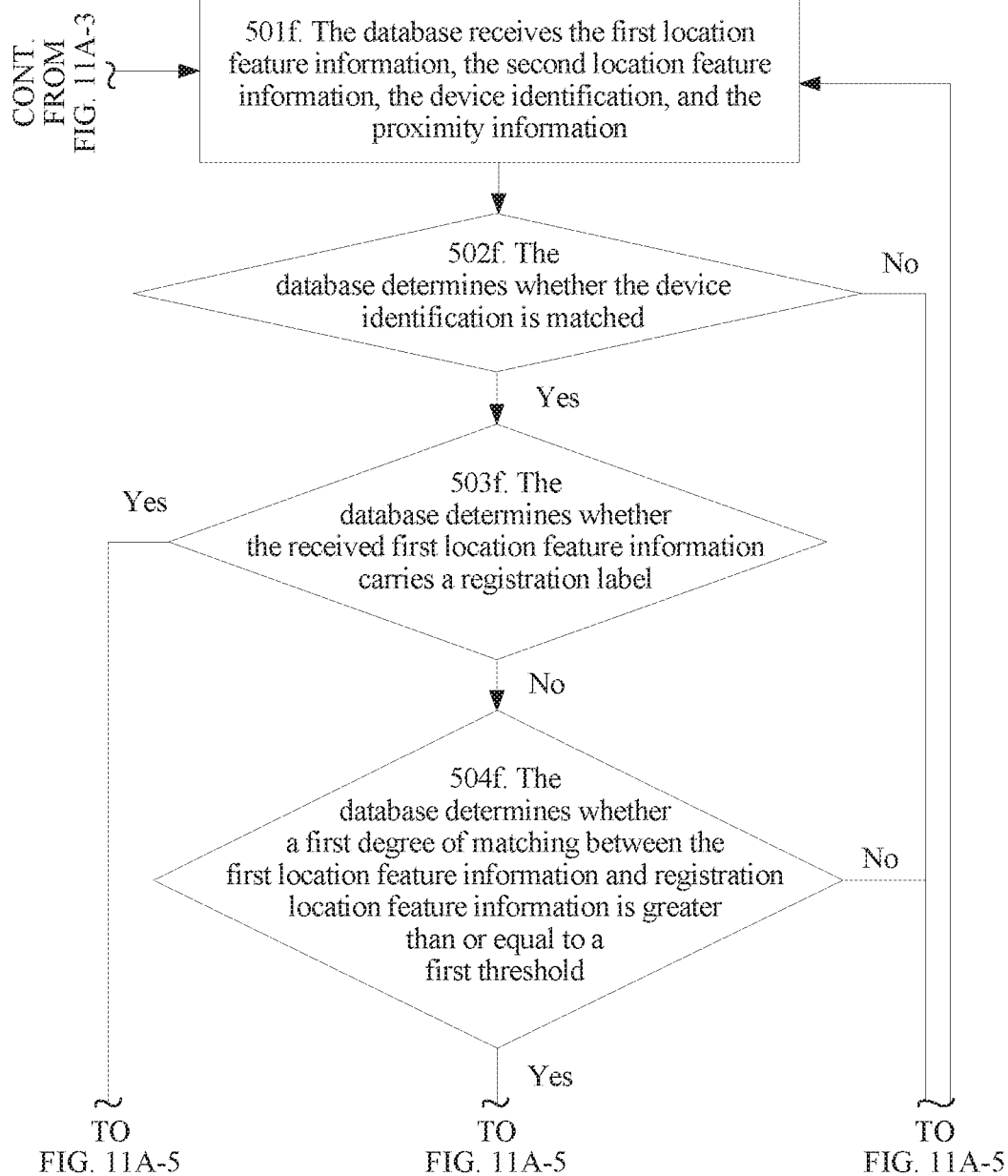
Figures 5, 11A:
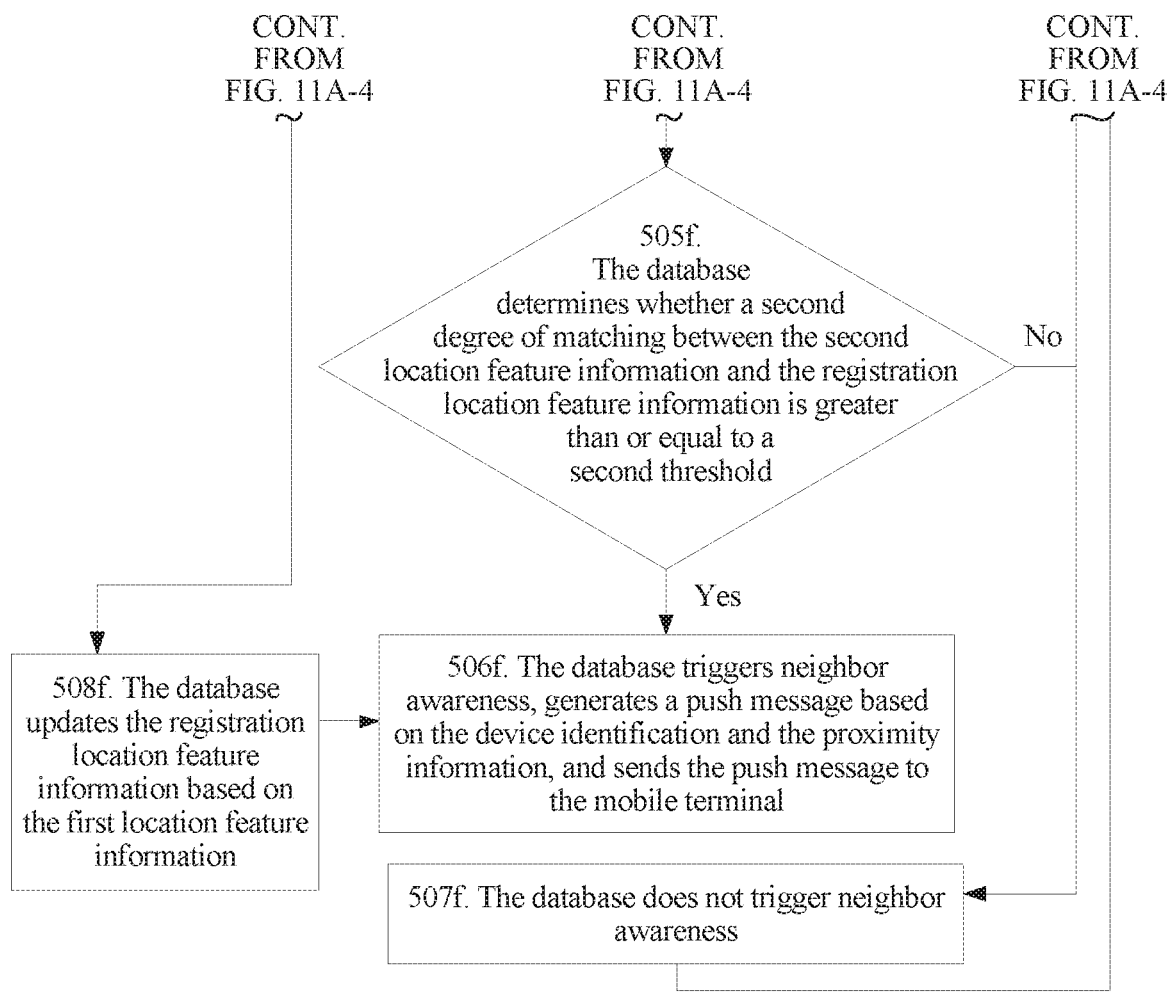
Figures 1, 11B:
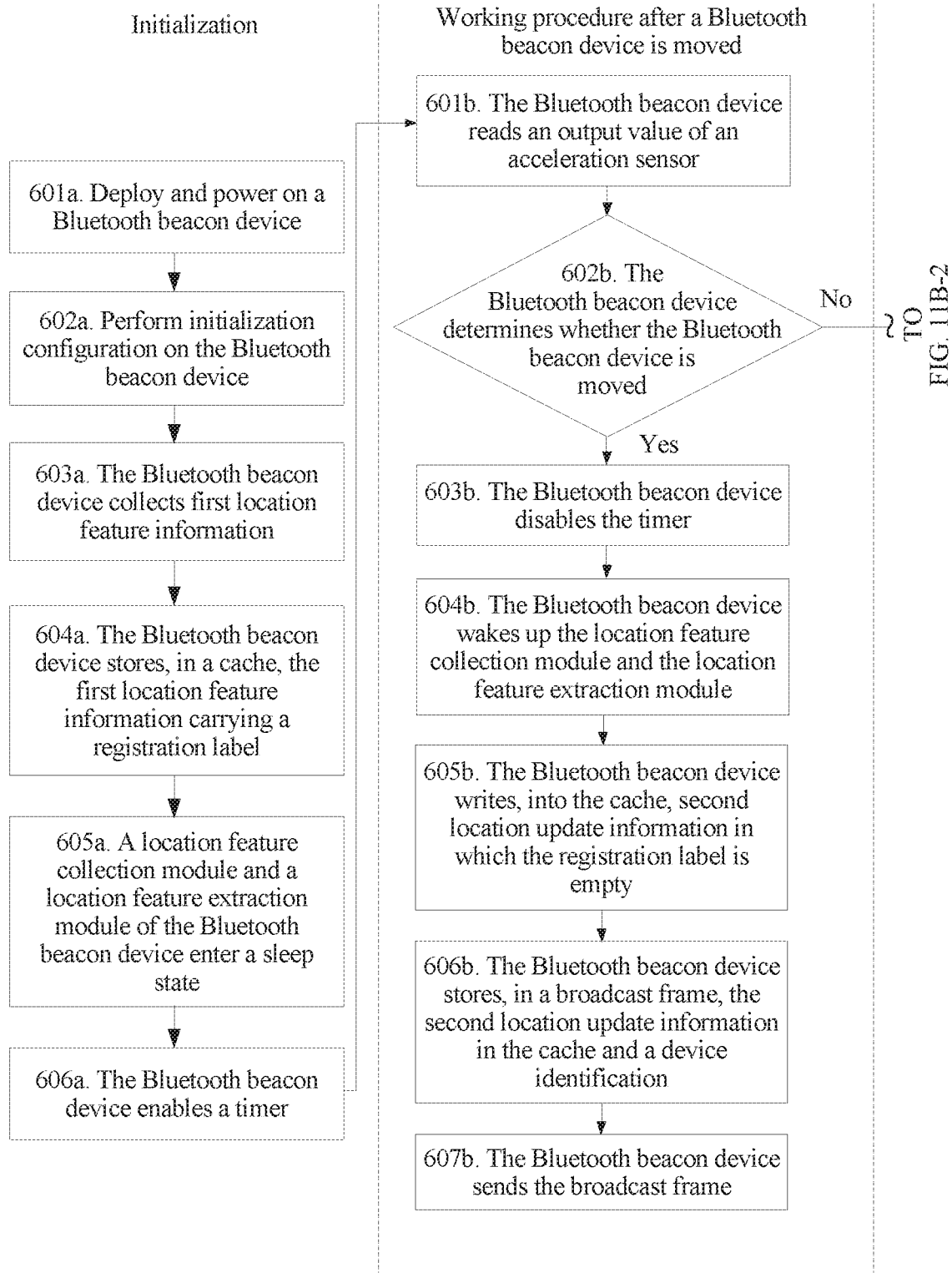
Figures 2, 11B:
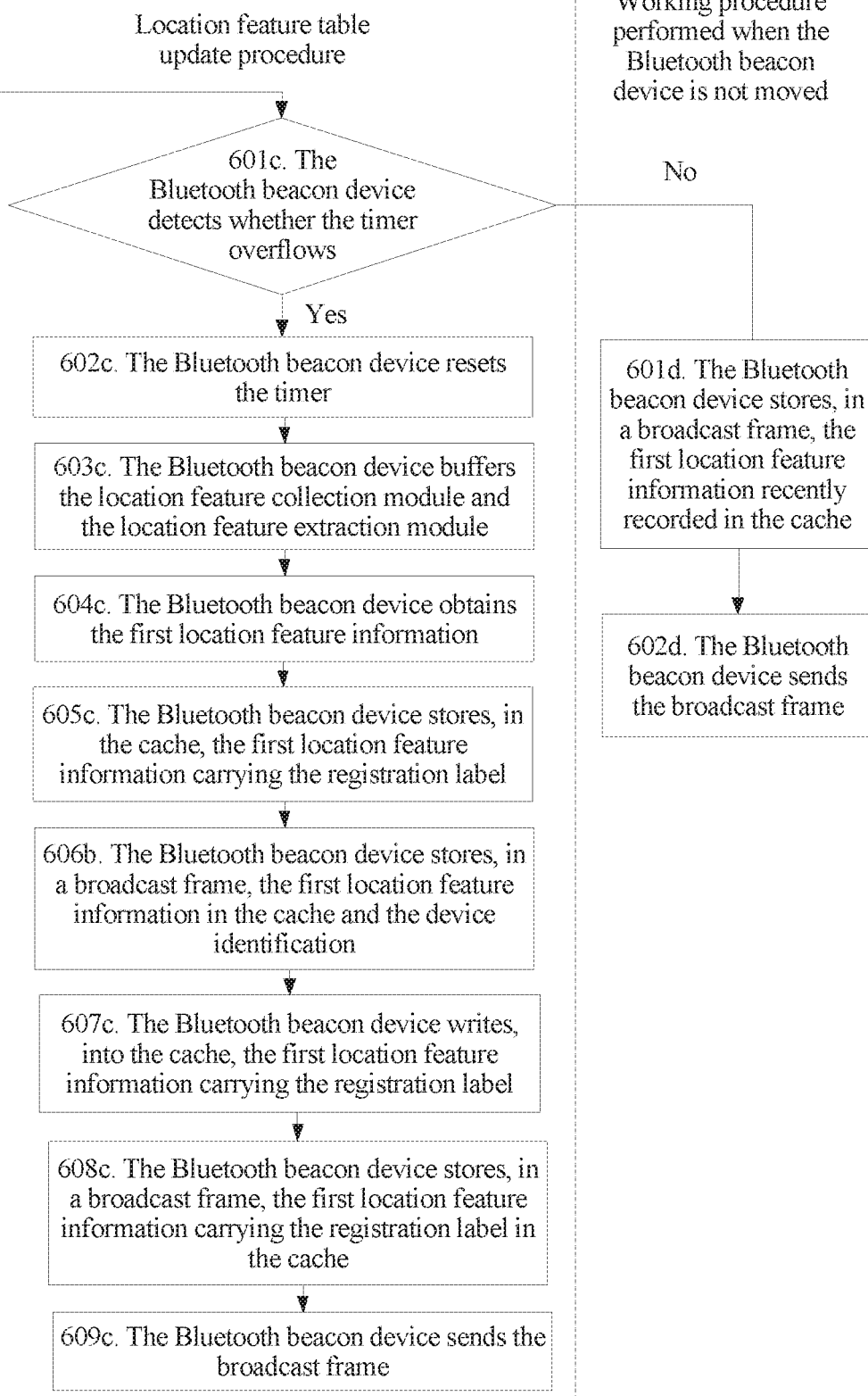
Figures 1, 12A:
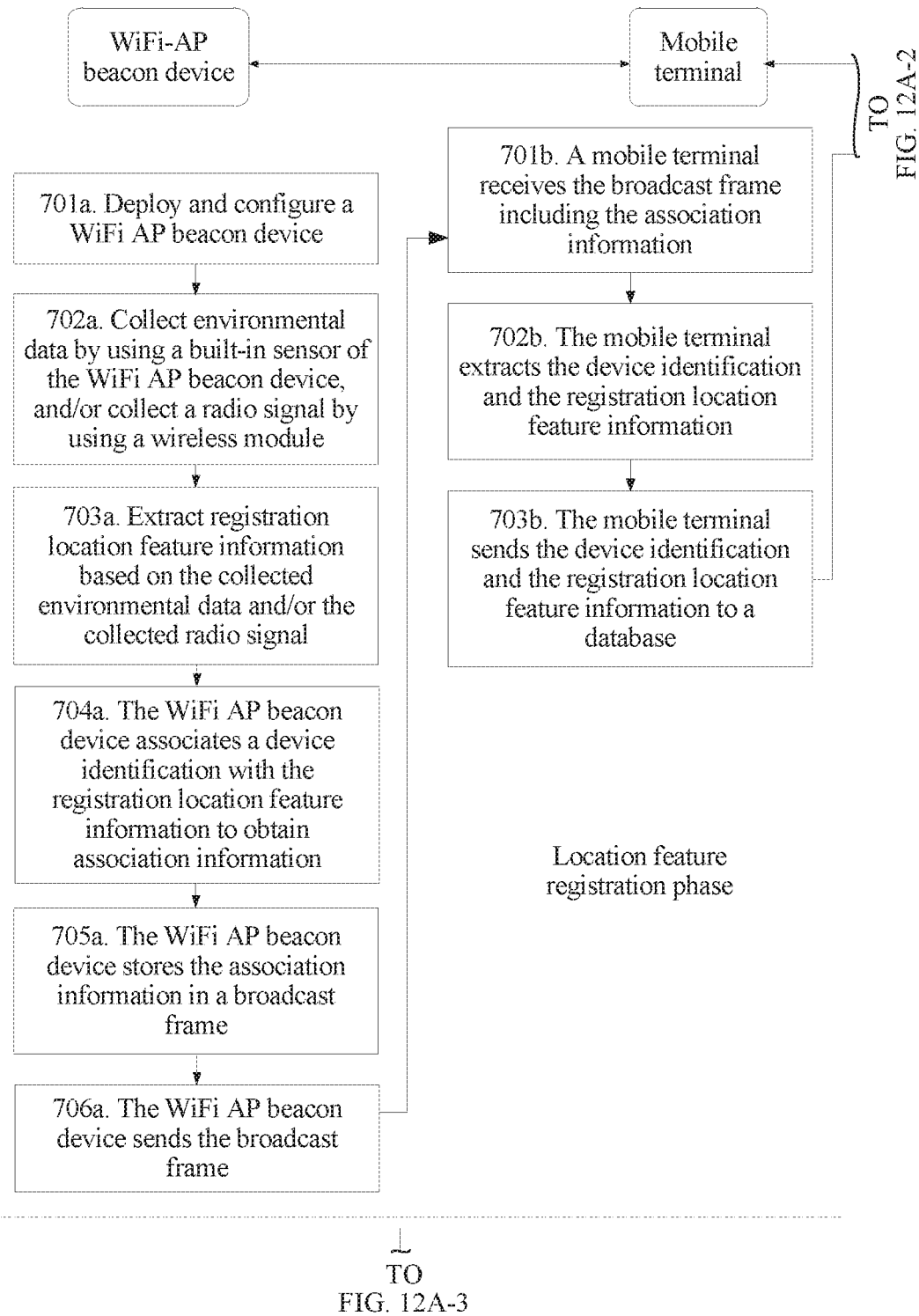
Figures 2, 12A:
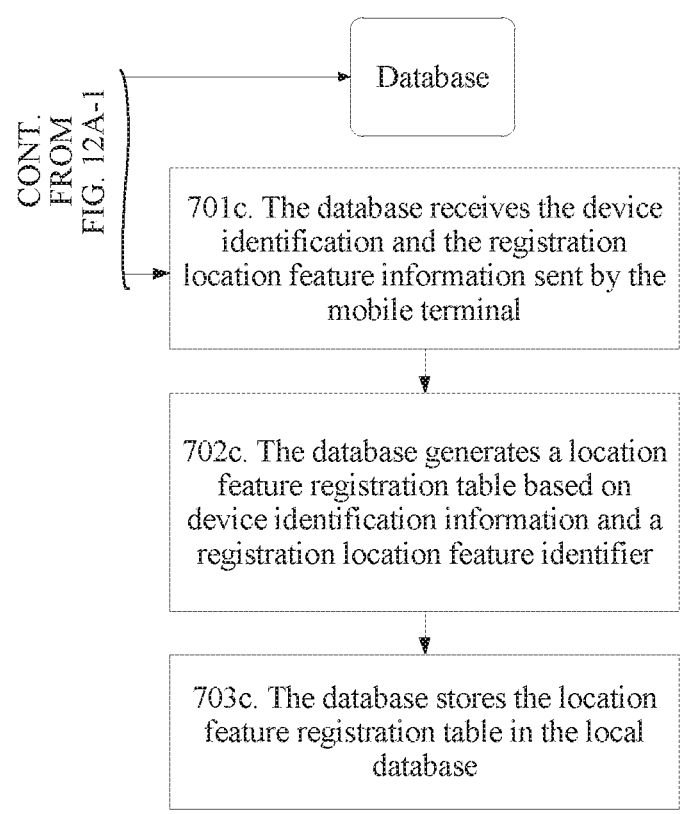
Figures 3, 12A:
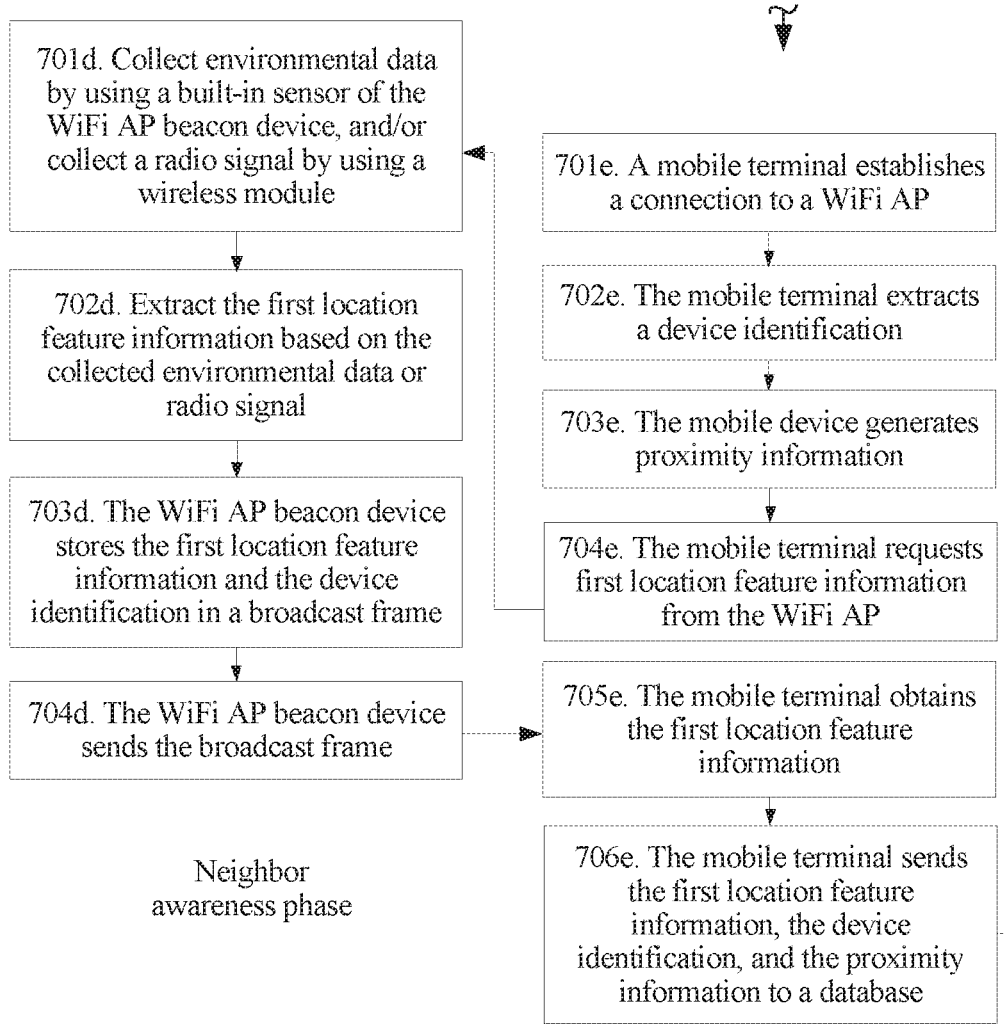
Figures 4, 12A:
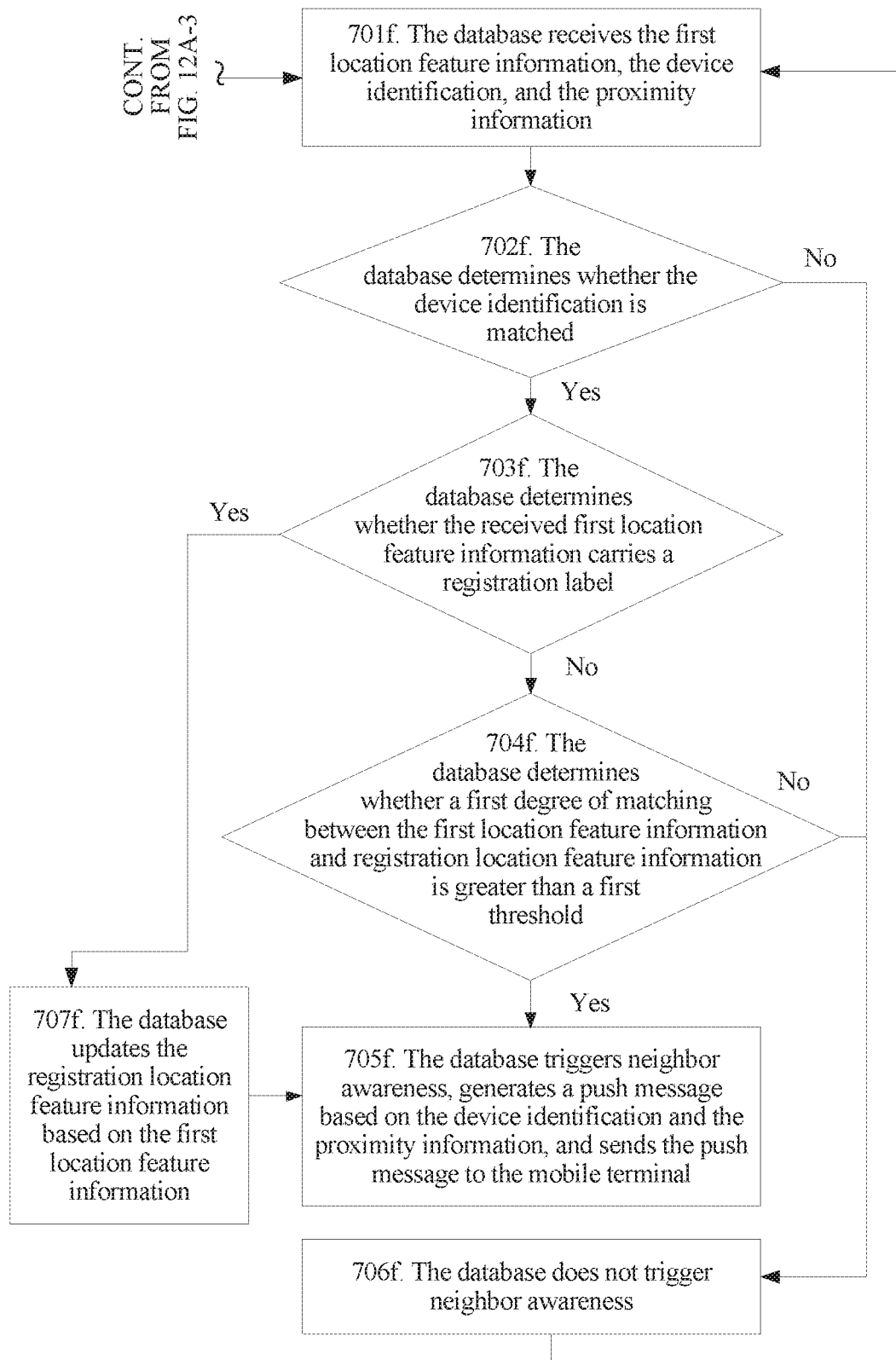
Figures 1, 12B:
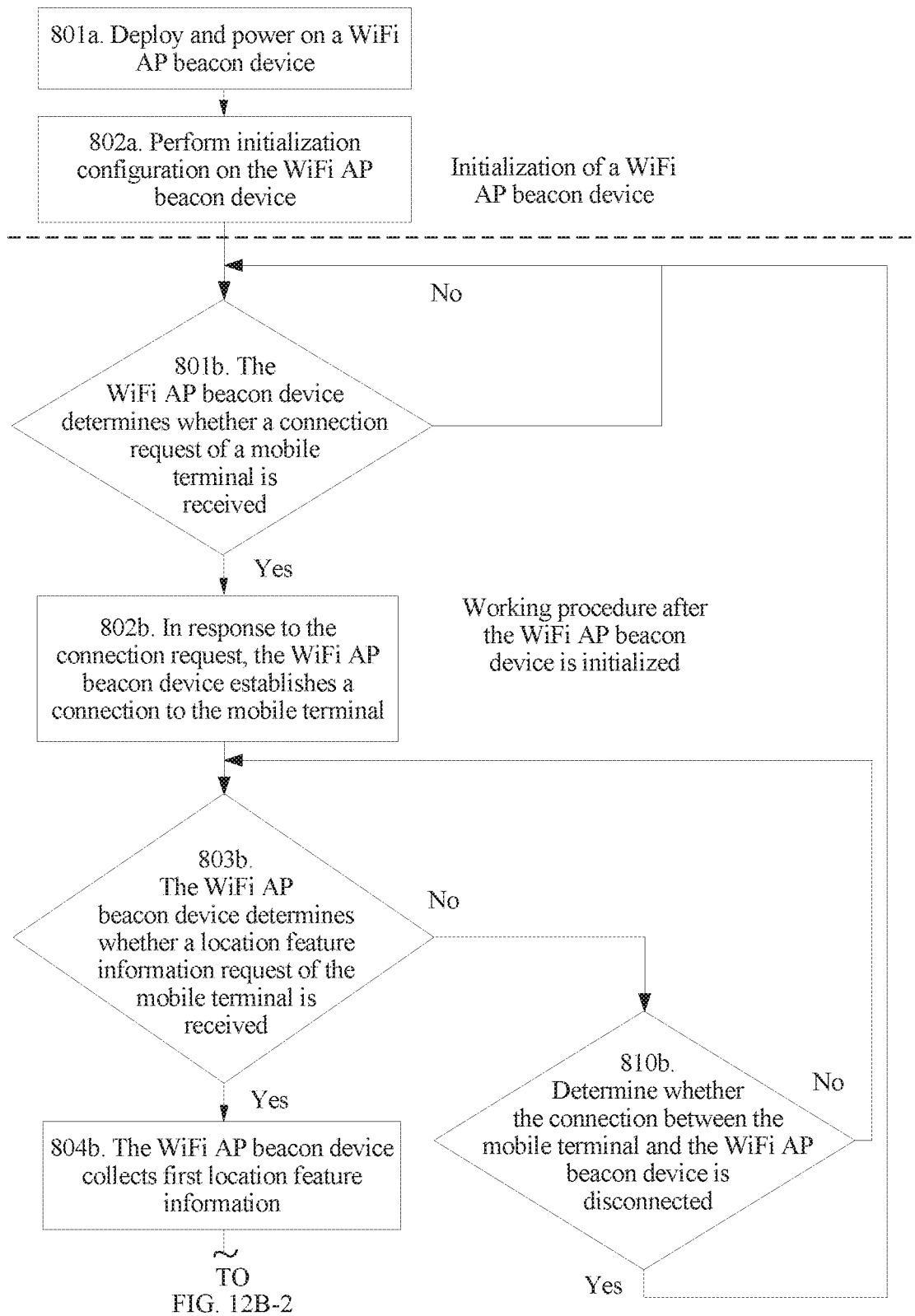
Figures 2, 12B:
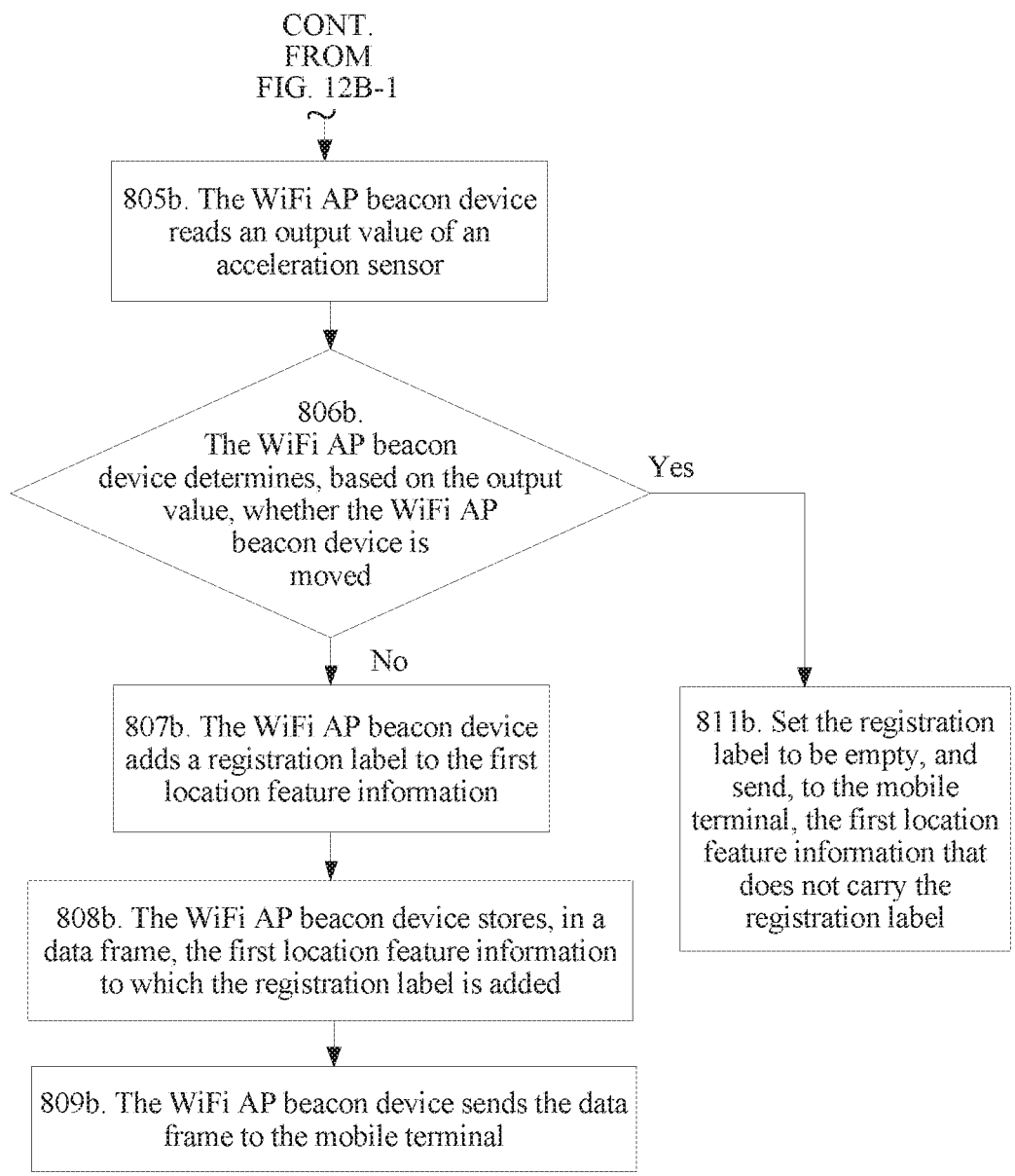

A neighbor awareness method in this application is described below in detail by using an example in which a beacon device is separately a Bluetooth beacon and a WiFi AP beacon device. For details, refer to FIG. 11A-1 to FIG. 11A-5, FIG. 11B-1 and FIG. 11B-2, FIG. 12A-1 to FIG. 12A-4, and FIG. 12B-1 and FIG. 12B-2. FIG. 11A-1 to FIG. 11A-5 are a flowchart of neighbor awareness performed when a beacon device is a Bluetooth beacon in a neighbor awareness method according to this application. FIG. 11B-1 and FIG. 11B-2 are a software flowchart in which a beacon device is a Bluetooth beacon in a neighbor awareness method according to this application. FIG. 12A-1 to FIG. 12A-4 are a flowchart of neighbor awareness performed when a beacon device is a WiFi AP beacon device in a neighbor awareness method according to this application. FIG. 12B-1 and FIG. 12B-2 are a software flowchart in which a beacon device is a WiFi AP beacon device in a neighbor awareness method according to this application.

Referring to FIG. 11A-1 to FIG. 11A-5, when the beacon device is a Bluetooth beacon device, neighbor awareness includes a location feature registration phase and a neighbor awareness phase. In the location feature registration phase, working procedures of the Bluetooth beacon device, a mobile terminal, and a database are respectively as follows:

Bluetooth beacon device:

501a. Deploy and configure the Bluetooth beacon device.

502a. Collect environmental data by using a built-in sensor of the Bluetooth beacon device, and/or collect a radio signal by using a wireless module.

503a. Extract registration location feature information based on the collected environmental data and/or the collected radio signal.

504a. The Bluetooth beacon device associates a device identification with the registration location feature information to obtain association information.

505a. The Bluetooth beacon device stores the association information in a broadcast frame.

506a. The Bluetooth beacon device sends the broadcast frame.

Mobile Terminal

501b. The mobile terminal receives the broadcast frame including the association information.

502b. The mobile terminal extracts the device identification and the registration location feature information from the association information.

503b. The mobile terminal sends the device identification and the registration location feature information to the database.

Database

501c. The database receives the device identification and the registration location feature information sent by the mobile terminal.

502c. The database generates a location feature registration table based on the device identification and the registration location feature information.

503c. The database stores the location feature registration table in the local database.

In the neighbor awareness phase, working procedures of the Bluetooth beacon device, the mobile terminal, and the database are respectively as follows:

Bluetooth Beacon Device:

501d. Collect environmental data by using a built-in sensor of the Bluetooth beacon device, and/or collect a radio signal by using a wireless module.

502d. Extract first location feature information based on the collected environmental data and/or the collected radio signal.

503d. The Bluetooth beacon device stores the first location feature information and a device identification in a broadcast frame.

504d. The Bluetooth beacon device sends the broadcast frame.

Mobile Terminal

501e. The mobile terminal receives the broadcast frame.

502e. The mobile terminal extracts the first location feature information from the broadcast frame.

503e. The mobile terminal extracts the device identification from the broad cast frame.

504e. The mobile terminal generates proximity information.

505e. The mobile terminal collects environmental data and/or a radio signal at a current location.

506e. The mobile terminal extracts second location feature information based on the collected environmental data and or the collected radio signal.

507e. The mobile terminal sends the first location feature information, the second location feature information, the device identification, and the proximity information to the database.

Database

501f. The database receives the first location feature information, the second location feature information, the device identification, and the proximity information.

502f. The database determines whether the device identification is matched; and performs step 503f if the device identification is matched; or performs step 507f if the device identification is not matched.

In this step, the database queries whether the device identification exists in a location feature registration table. If the device identification exists in the location feature registration table, it indicates that the device identification matches; or if the device identification does not exist in the location feature registration table, it indicates that the device identification does not match.

503f. The database determines whether the received first location feature information carries a registration label; and performs step 508f if the received first location feature information carries the registration label; or performs step 504f if the received first location feature information does not carry the registration label.

504f. The database determines whether a first degree of matching between the first location feature information and registration location feature information is greater than or equal to a first threshold; and performs step 505f if the first matching degree is greater than or equal to the first threshold; or performs step 507f if the first matching degree is less than the first threshold.

505f. The database determines whether a second degree of matching between the second location feature information and the registration location feature information is greater than or equal to a second threshold; and performs step 506f if the second matching degree is greater than or equal to the second threshold; or performs step 507f if the second matching degree is less than the second threshold.

506f. The database triggers neighbor awareness, generates a push message based on the device identification and the proximity information and sends the push message to the mobile terminal.

507f. The database does not trigger neighbor awareness and returns to step 501f.

508f. The database updates the registration location feature information based on the first location feature information, and then performs step 506f.

Referring to FIG. 11B-1 and FIG. 11B-2, when the beacon device is a Bluetooth beacon device, in a neighbor awareness phase, a software procedure of the Bluetooth beacon device is as follows:

Initialization Phase of the Bluetooth Beacon Device:

601a. Deploy and power on the Bluetooth beacon device.

602a. Perform initialization configuration on the Bluetooth beacon device.

603a. The Bluetooth beacon device collects first location feature information.

It should be noted that, before the first location feature information is collected to perform the neighbor awareness phase, registration location feature information further needs to be collected to perform a location registration phase.

604a. The Bluetooth beacon device stores, in a cache, the first location feature information carrying a registration label.

605a. A location feature collection module and a location feature extraction module of the Bluetooth beacon device enter a sleep state.

606a. The Bluetooth beacon device enables a timer.

In this step, the Bluetooth beacon device enables the timer used to update a location feature registration table.

A Working Procedure After the Bluetooth Beacon Device is Moved:

601b. The Bluetooth beacon device reads an output value of an acceleration sensor.

602b. The Bluetooth beacon device determines whether the Bluetooth beacon device is moved; and performs step 603b if the Bluetooth beacon device is moved; or performs step 601c if the Bluetooth beacon device is not moved.

603b. The Bluetooth beacon device disables the timer.

604b. The Bluetooth beacon device wakes up the location feature collection module and the location feature extraction module.

605b. The Bluetooth beacon device writes, into the cache, the first location feature information in which the registration label is empty.

606b. The Bluetooth beacon device stores, in a broadcast frame, the first location feature information in the cache and a device identification.

607b. The Bluetooth beacon device sends the broadcast frame.

Location Feature Registration Table Updating:

601c. The Bluetooth beacon device detects whether the timer overflows; and performs step 602c if the timer overflows; or performs step 601d if the timer does not overflow.

602c. The Bluetooth beacon device resets the timer.

603c. The Bluetooth beacon device buffers the location feature collection module and the location feature extraction module.

604c. The Bluetooth beacon device obtains the first location feature information.

605c. The Bluetooth beacon device stores, in the cache, the first location feature information carrying the registration label.

606c. The location feature collection module and the location feature extraction module of the Bluetooth beacon device enter the sleep state.

607c. The Bluetooth beacon device writes, into the cache, the first location feature information carrying the registration label.

608c. The Bluetooth beacon device stores, in a broadcast frame, the first location feature information carrying the registration label in the cache.

609c. The Bluetooth beacon device sends the broadcast frame.

A working procedure of the Bluetooth beacon device in a normal state:

601d. The Bluetooth beacon device stores, in a broadcast frame, the first location feature information recently recorded in the cache.

602d. The Bluetooth beacon device sends the broadcast frame.

Referring to FIG. 12A-1 to FIG. 12A-4, when the beacon device is a WiFi AP beacon device, neighbor awareness includes a location feature registration phase and a neighbor awareness phase. In the location feature registration phase, working procedures of the WiFi AP beacon device, a mobile phone, and a database are respectively as follows:

WiFi AP Beacon Device:

701a. Deploy and configure the WiFi AP beacon device.

702a. Collect environmental data by using a built-in sensor of the WiFi AP beacon de vice, and/or collect a radio signal by using a wireless module.

703a. Extract registration location feature information based on the collected environmental data and/or the collected radio signal.

704a. The WiFi AP beacon device associates a device identification with the registration location feature information to obtain association information.

In this step, for example, the association information is related to MAC.

705a. The WiFi AP beacon device stores the association information in a broadcast frame.

706a. The WiFi AP beacon device sends the broadcast frame.

Mobile Terminal

701b. The mobile terminal receives the broadcast frame including the association information.

702b. The mobile terminal extracts the device identification and the registration location feature information from the association information.

703b. The mobile terminal sends the device identification and the registration location feature information to the database.

Database

701c. The database receives the device identification and the registration location feature information sent by the mobile terminal.

702c. The database generates a location feature registration table based on the device identification and the registration location feature information.

703c. The database stores the location feature registration table in the local database.

In the neighbor awareness phase, the mobile terminal first performs the following steps 701e to 704e. After performing step 704e, the mobile terminal triggers the WiFi AP beacon device to perform steps 701d to 704d. Then, the mobile terminal performs steps 705e and 706e. Finally, the database performs steps 701f to 708f. Working procedures of the WiFi AP beacon device, the mobile phone, and the database are respectively described below.

WiFi AP Beacon Device:

701d. Collect environmental data by using a built-in sensor of the WiFi AP beacon device, and/or collect a radio signal by using a wireless module.

Specifically, after the mobile terminal performs step 704e, the WiFi AP beacon device performs step 701d.

In this step, when the mobile terminal requests first location feature information from the WiFi AP beacon device, the WiFi AP collects the environmental data and/or the radio signal.

702d. Extract the first location feature information based on the collected environmental data and/or the collected radio signal.

703d. The WiFi AP beacon device stores the first location feature information and the device identification in a broadcast frame.

704d. The WiFi AP beacon device sends the broadcast frame.

Mobile Terminal

701e. The mobile terminal establishes a connection to a WiFi AP.

702e. The mobile terminal extracts a device identification.

703e. The mobile terminal generates proximity information.

704e. The mobile terminal requests first location feature information from the WiFi AP, and triggers the WiFi AP beacon device to perform step 701d.

705e. The mobile terminal obtains the first location feature information.

706e. The mobile terminal sends the first location feature information, the device identification, and the proximity information to the database.

Database

701f. The database receives the first location feature information, the device identification, and the proximity information.

702f. The database determines whether the device identification is matched; and performs step 703f if the device identification is matched; or performs step 706f if the device identification is not matched.

In this step, the database queries whether the device identification exists in a location feature registration table. If the device identification exists in the location feature registration table, it indicates that the device identification matches; or if the device identification does not exist in the location feature registration table, it indicates that the device identification does not match.

703f. The database determines whether the received first location feature information carries a registration label; and performs step 707f if the received first location feature information carries the registration label; or performs step 704f if the received first location feature information does not carry the registration label.

In this step, the database determines whether registration location feature information needs to be updated, that is, whether the first location feature information carrying the registration label is received.

704f. The database determines whether a first degree of matching between the first location feature information and registration location feature information is greater than a first threshold; and performs step 705f if the first matching degree is greater than the first threshold; or performs step 706f if the first matching degree is not greater than the first threshold.

705f. The database triggers neighbor awareness, generates a push message based on the device identification and the proximity information, and sends the push message to the mobile terminal.

706f. The database does not trigger neighbor awareness, and returns to step 701f.

707f. The database updates the registration location feature information based on the first location feature information, and then performs step 705f.

Referring to FIG. 12B-1 and FIG. 12B-2, when the beacon device is a WiFi AP beacon device, in a neighbor awareness phase, a software procedure of the WiFi AP beacon device is as follows:

initialization phase of the WiFi AP beacon device:

801a. Deploy and power on the WiFi AP beacon device.

802a. Perform initialization configuration on the WiFi AP beacon device.

Neighbor awareness phase after the WiFi AP beacon device is initialized:

801b. The WiFi AP beacon device determines whether a connection request of a mobile terminal is received; and performs step 802b if the connection request of the mobile terminal is received; or performs step 801b if the connection request of the mobile terminal is not received.

802b. In response to the connection request, the WiFi AP beacon device establishes a connection to the mobile terminal.

803b. The WiFi AP beacon device determines whether a location feature information request of the mobile terminal is received; and performs step 804b if the location feature information request of the mobile terminal is received; or performs step 810b if the location feature information request of the mobile terminal is not received.

804b. The WiFi AP beacon device collects first location feature information.

805b. The WiFi AP beacon device reads an output value of an acceleration sensor.

806b. The WiFi AP beacon device determines, based on the output value, whether the WiFi AP beacon device is moved; and performs step 807b if the WiFi AP beacon device is not moved; or performs step 811b if the WiFi AP beacon device is moved.

807b. The WiFi AP beacon device adds a registration label to the first location feature information.

808b. The WiFi AP beacon device stores, in a data frame, the first location feature information to which the registration label is added.

809b. The WiFi AP beacon device sends the data frame to the mobile terminal.

810b. Determine whether the connection between the mobile terminal and the WiFi AP beacon device is disconnected; and return to step 801b if the connection between the mobile terminal and the WiFi AP beacon device is disconnected; or return to step 803b if the connection between the mobile terminal and the WiFi AP beacon device is not disconnected.

811b. Set the registration label to be empty, and send, to the mobile terminal, the first location feature information that does not carry the registration label.

In the foregoing embodiment, the registration location feature information of the beacon device is stored in the database; location compliance verification is performed by determining a degree of matching between the first location feature information collected by the beacon device in real time and the registration location feature information of the beacon device; and the beacon device is prevented from being imitated by determining the degree of matching between the first location feature information collected by the beacon device in real time and the registration location feature information of the beacon device and by determining a degree of matching between the second location feature information collected by the mobile terminal in real time and the registration location feature information. However, this embodiment of this application is not limited thereto.

For example, location compliance verification may be performed by determining the degree of matching between the second location feature information collected by the mobile terminal in real time and the registration location feature information of the beacon device.

For another example, originally assembled correct location feature information of the beacon device is not registered, and instead, location feature information of the mobile terminal is registered, and registration location feature information of the mobile terminal is stored in the database. Then, location compliance of the beacon device is verified by determining a degree of matching between the first location feature information collected by the beacon device in real time and the registration location feature information of the mobile terminal; or location compliance of the beacon device is verified by determining a degree of matching between the second location feature information collected by the mobile terminal in real time and the registration location feature information of the mobile terminal; or the beacon device is prevented from being imitated by determining a degree of matching between the first location feature information collected by the beacon device in real time and the registration location feature information of the mobile terminal and by determining a degree of matching between the second location feature information collected by the mobile terminal in real time and the registration location feature information of the mobile terminal.

Figure 13:
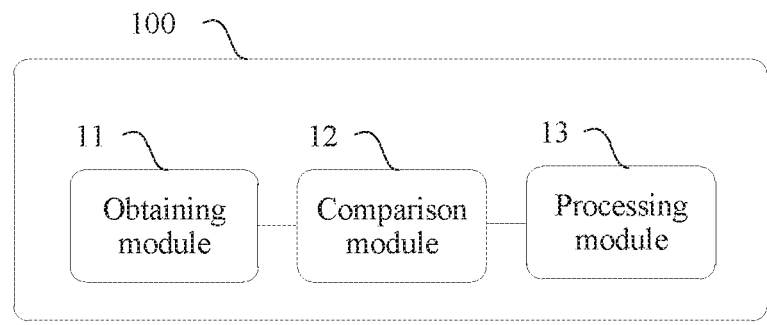
FIG. 13 is a schematic structural diagram of Embodiment 1 of a beacon device according to this application.

FIG. 13 is a schematic structural diagram of Embodiment 1 of a beacon device according to this application. The beacon device provided in this embodiment may implement all steps of a method that is applied to the beacon device and that is provided in any embodiment of this application. Specifically, a beacon device 100 provided in this embodiment includes:

an obtaining module 11, configured to obtain first location feature information, where the first location feature information indicates an environmental condition around a current location of the beacon device, where the obtaining module 11 is further configured to obtain registration location feature information, where the registration location feature information indicates an environmental condition around an original assembly location of the beacon device;

a comparison module 12, configured to compare the first location feature information with the registration location feature information; and a processing module 13, configured to determine, based on a comparison result of the comparison module 12, whether to trigger neighbor awareness.

The beacon device provided in this embodiment of this application obtains the first location feature information that indicates the environmental condition around the current location of the beacon device; obtains the registration location feature information that indicates the environmental condition around the original assembly location of the beacon device; then compares the two pieces of information to perform compliance detection on a location of the beacon device; and determines, based on a detection result, whether to trigger neighbor awareness. Therefore, neighbor awareness is associated with location compliance, and the beacon device is prevented from being manually moved, thereby improving security of the beacon device.

Optionally, in an embodiment of this application, the obtaining module Ti is configured to obtain the registration location feature information based on a registration location feature table, where the registration location feature table stores a correspondence between an identification of the beacon device and the registration location feature information.

Optionally, in an embodiment of this application, the comparison module 12 is configured to compare a first degree of matching between the first location feature information and the registration location feature information.

The processing module 13 is configured to: when the first matching degree is greater than or equal to the first threshold, trigger neighbor awareness; or when the first matching degree is less than the first threshold, forbid neighbor awareness.

Figure 14:
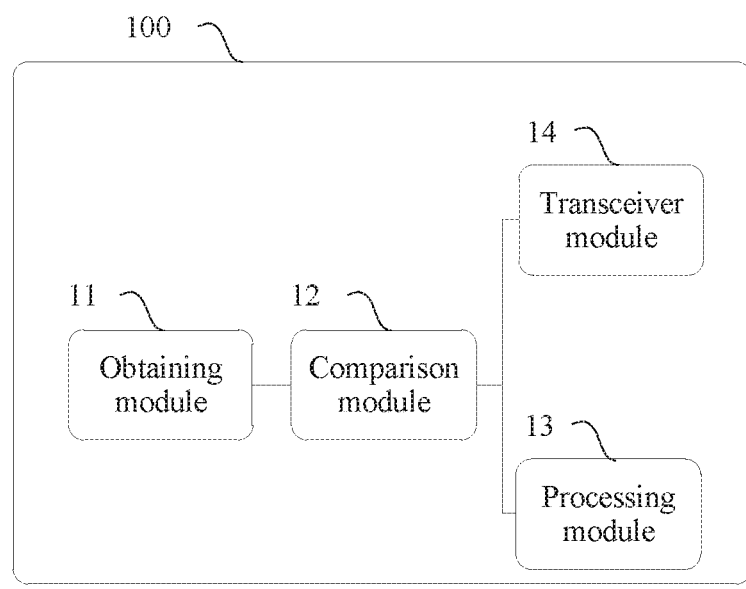
FIG. 14 is a schematic structural diagram of Embodiment 2 of a beacon device according to this application.

FIG. 14 is a schematic structural diagram of Embodiment 2 of a beacon device according to this application. Referring to FIG. 14, optionally, in an embodiment of this application, the beacon device 100 further includes:

a transceiver module 14, configured to: when the first matching degree is greater than or equal to the first threshold, send a broadcast message, where the broadcast message includes a registration label, and the registration label is used to update the registration location feature information.

Optionally, in an embodiment of this application, the environmental condition includes environmental data and/or a radio signal.

Figure 15:
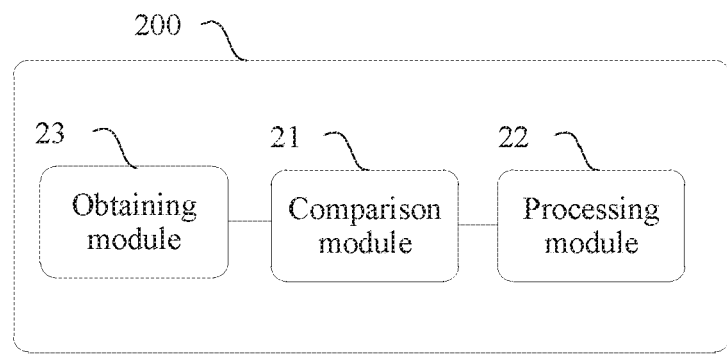
FIG. 15 is a schematic structural diagram of Embodiment 1 of a mobile terminal according to this application.

FIG. 15 is a schematic structural diagram of Embodiment 1 of a mobile terminal according to this application. The mobile terminal provided in this embodiment may implement all steps of a method that is applied to the mobile terminal and that is provided in any embodiment of this application. Specifically, a mobile terminal 200 provided in this embodiment includes:

an obtaining module 21, configured to obtain first location feature information of a beacon de vice, where the first location feature information indicates an environmental condition around a current location of the beacon device, where the obtaining module 21 is further configured to obtain registration location feature information of the beacon device, where the registration location feature information indicates an environmental condition around an original assembly location of the beacon device;

a comparison module 22, configured to compare the first location feature information with the registration location feature information; and a processing module 23, configured to determine, based on a comparison result of the comparison module 22, whether to trigger neighbor awareness.

The mobile terminal provided in this embodiment of this application obtains the first location feature information that indicates the environmental condition around the current location of the beacon device; obtains the registration location feature information that indicates the environmental condition around the original assembly location of the beacon device; then compares the two pieces of information to perform compliance detection on a location of the beacon device; and determines, based on a detection result, whether to trigger neighbor awareness. Therefore, neighbor awareness is associated with location compliance, and the beacon device is prevented from being manually moved, thereby improving security of the mobile terminal.

Optionally, in an embodiment of this application, the obtaining module 21 is configured to obtain the registration location feature information based on a registration location feature table, where the registration location feature table stores a correspondence between an identification of the beacon device and the registration location feature information.

Figure 16:
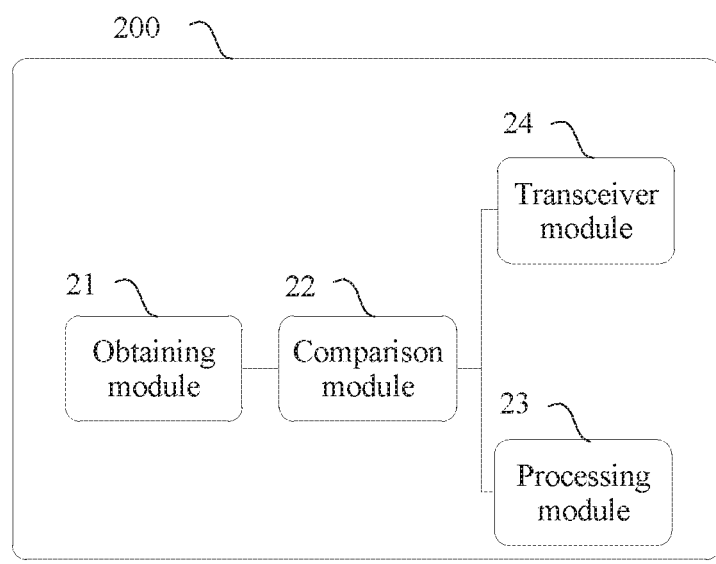
FIG. 16 is a schematic structural diagram of Embodiment 2 of a mobile terminal according to this application.

FIG. 16 is a schematic structural diagram of Embodiment 2 of a mobile terminal according to this application. Referring to FIG. 16, optionally, in an embodiment of this application, the mobile terminal 200 further includes:

a transceiver module 24, configured to communicate with a server receive the registration location feature table.

Optionally, in an embodiment of this application, the comparison module 22 is configured to compare a first degree of matching between the first location feature information and the registration location feature information.

The processing module 23 is configured to: when the first matching degree is greater than or equal to a first threshold, trigger neighbor awareness; or when the first matching degree is less than the first threshold, forbid neighbor awareness.

Optionally, in an embodiment of this application, the obtaining module 21 is further configured to obtain second location feature information, where the second location feature information indicates an environmental condition around a current location of the mobile terminal.

Optionally, in an embodiment of this application, the comparison module 22 is configured to compare the first degree of matching between the first location feature information and the registration location feature information, and compare a second degree of matching between the second location feature information and the registration location feature information.

The processing module 23 is configured to: trigger neighbor awareness when the first matching degree is greater than or equal to the first threshold, and the second matching degree is greater than or equal to the second threshold; or forbid neighbor awareness when the first matching degree is less than the first threshold, and/or the second matching degree is less than the second threshold.

Optionally, in an embodiment of this application, the transceiver module 24 is configured to receive a registration label sent by the beacon device, where the registration label is used to update the registration location feature information.

Optionally, in an embodiment of this application, the transceiver module 24 is further configured to receive the first location feature information sent by the beacon device, where the first location feature information is collected by the beacon device.

Optionally, in an embodiment of this application, the environmental condition includes environmental data and/or a radio signal.

Figure 17:
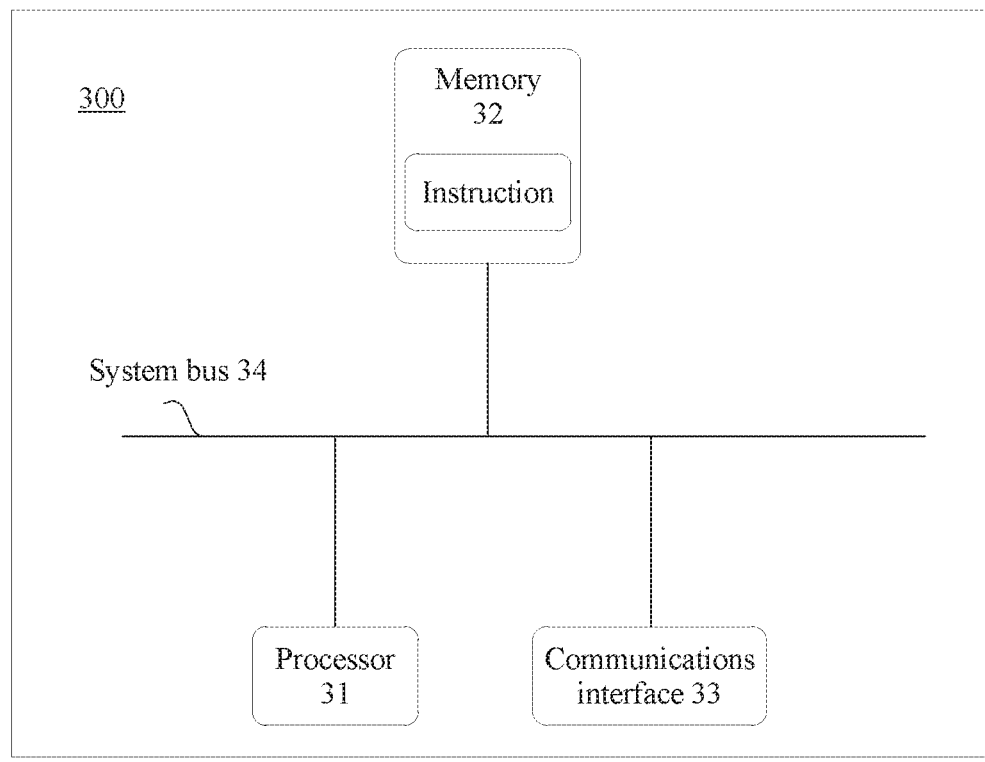
FIG. 17 is a schematic structural diagram of Embodiment 3 of a beacon device according to this application.

FIG. 17 is a schematic structural diagram of Embodiment 3 of a beacon device according to this application. A beacon device 300 provided in this embodiment includes a processor 31, a memory 32, a communications interface 33, and a system bus 34. The memory 32 and the communications interface 33 are connected to and communicate with the processor 31 by using the system bus 34, the memory 32 is configured to store a computer execution instruction, the communications interface 33 is configured to communicate with another device, and the processor 31 is configured to run the computer execution instruction, so that the beacon device performs all steps of the foregoing method applied to the beacon device.

Figure 18:
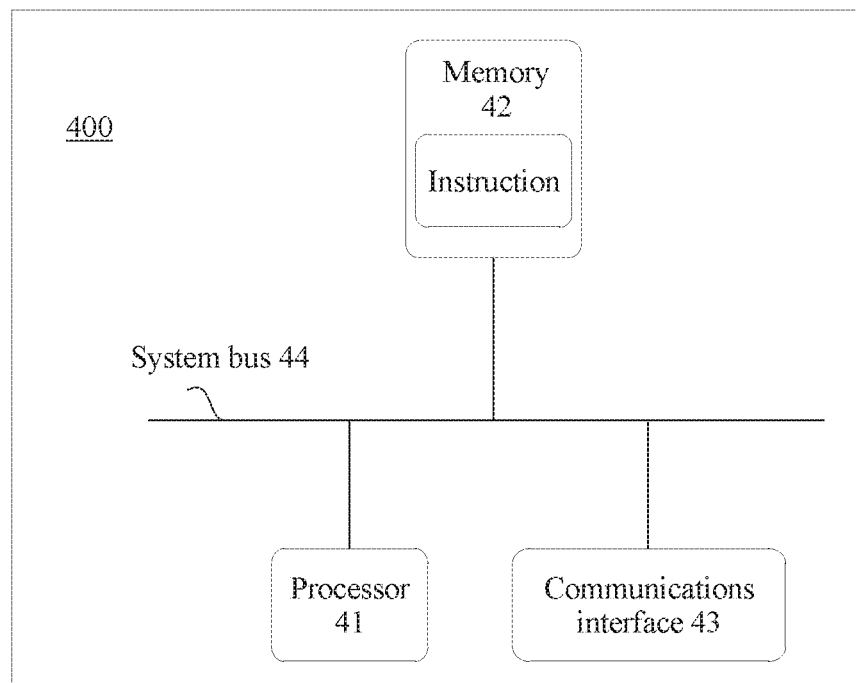
FIG. 18 is a schematic structural diagram of Embodiment 3 of a mobile terminal according to this application.

FIG. 18 is a schematic structural diagram of Embodiment 3 of a mobile terminal according to this application. A mobile terminal 400 provided in this embodiment includes a processor 41, a memory 42, a communications interface 43, and a system bus 44. The memory 42 and the communications interface 43 are connected to and communicate with the processor 41 by using the system bus 44, the memory 42 is configured to store a computer execution instruction, the communications interface 43 is configured to communicate with another device, and the processor 41 is configured to run the computer execution instruction, so that the mobile terminal performs all steps of the foregoing method applied to the mobile terminal.

The system bus mentioned in FIG. 17 and FIG. 18 may be a peripheral component interconnect (peripheral component interconnect, PCI) bus, an extended industry standard architecture (extended industry standard architecture, EISA) bus, or the like. The system bus may be classified into an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (random access memory, RAM), or may include a nonvolatile memory (non-volatile memory), for example, at least one magnetic disk storage.

The processor may be a general purpose processor, including a central processing unit (Central Processing Unit, CPU), a network processor (Network Processor, NP), and the like; or may be a digital signal processor (Digital Signal Processing, DSP), an application-specific integrated circuit (Application Specific Integrated Circuit, ASIC), a field-programmable gate array (Field-Programmable Gate Array, FPGA), or another programmable logic device, a discrete gate or transistor logic device, or a discrete hardware component.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

What is claimed is:

1. A neighbor awareness method, comprising:
   obtaining first location feature information, wherein the first location feature information indicates an environmental condition around a current location of a beacon device;
   obtaining registration location feature information of the beacon device, wherein the registration location feature information indicates an environmental condition around an original assembly location of the beacon device; and
   comparing the first location feature information with the registration location feature information to determine whether to trigger neighbor awareness based on determining whether a degree of matching between the first location feature information and the registration location feature information is above a threshold, wherein both the environmental condition around the current location and the environmental condition around the original assembly location comprise environmental data collected by the beacon device and a radio signal collected by the beacon device.

2. The neighbor awareness method of claim 1, wherein comparing the first location feature information with the registration location feature information to determine whether to trigger the neighbor awareness comprises:
   comparing a first degree of matching between the first location feature information and the registration location feature information; and
   forbidding neighbor awareness when the first degree of matching is less than a first threshold.

3. The neighbor awareness method of claim 1, wherein obtaining the first location feature information comprises receiving the first location feature information from the beacon device, and wherein the first location feature information is collected by the beacon device.

4. The neighbor awareness method of claim 1, wherein obtaining the registration location feature information of the beacon device comprises obtaining the registration location feature information based on a registration location feature table, and wherein the registration location feature table stores a correspondence between an identification of the beacon device and the registration location feature information.

5. The neighbor awareness method of claim 4, wherein before obtaining the registration location feature information based on the registration location feature table, the method further comprises communicating with a server to receive the registration location feature table.

6. The neighbor awareness method of claim 1, wherein comparing the first location feature information with the registration location feature information to determine whether to trigger the neighbor awareness comprises:
   comparing a first degree of matching between the first location feature information and the registration location feature information; and
   triggering neighbor awareness when the first degree of matching is greater than or equal to a first threshold.

7. The neighbor awareness method of claim 6, wherein the neighbor awareness method further comprises receiving a registration label from the beacon device when the first degree of matching is greater than or equal to the first threshold, and wherein the registration label is configured to update the registration location feature information.

8. The neighbor awareness method of claim 1, wherein before comparing the first location feature information with the registration location feature information to determine whether to trigger neighbor awareness, the neighbor awareness method further comprises obtaining second location feature information, and wherein the second location feature information indicates an environmental condition around a current location of a mobile terminal.

9. The neighbor awareness method of claim 8, wherein comparing the first location feature information with the registration location feature information to determine whether to trigger the neighbor awareness comprises:
   comparing a first degree of matching between the first location feature information and the registration location feature information;
   comparing a second degree of matching between the second location feature information and the registration location feature information; and
   triggering neighbor awareness when the first degree of matching is greater than or equal to a threshold and when the second degree of matching is greater than or equal to a second threshold.

10. The neighbor awareness method of claim 8, wherein comparing the first location feature information with the registration location feature information to determine whether to trigger the neighbor awareness comprises:
    comparing a first degree of matching between the first location feature information and the registration location feature information;
    comparing a second degree of matching between the second location feature information and the registration location feature information; and
    forbidding neighbor awareness when the first degree of matching is less than a first threshold and when the second degree of matching is less than a second threshold.

11. A mobile terminal, comprising:
    a non-transitory memory comprising instructions; and
    at least one processor coupled to the non-transitory memory, wherein the instructions are executed by the at least one processor to cause the mobile terminal to be configured to:
      obtain first location feature information, wherein the first location feature information indicates an environmental condition around a current location of a beacon device;
      obtain registration location feature information of the beacon device, wherein the registration location feature information indicates an environmental condition around an original assembly location of the beacon device; and
      compare the first location feature information with the registration location feature information to determine whether to trigger neighbor awareness based on determining whether a degree of matching between the first location feature information and the registration location feature information is above a threshold, wherein both the environmental condition around the current location and the environmental condition around the original assembly location comprise environmental data collected by the beacon device and a radio signal collected by the beacon device.

12. The mobile terminal of claim 11, wherein the instructions further cause the mobile terminal to be configured to:
   compare a first degree of matching between the first location feature information and the registration location feature information; and
   forbid neighbor awareness when the first degree of matching is less than a first threshold.

13. The mobile terminal of claim 11, wherein the instructions further cause the mobile terminal to be configured to receive the first location feature information from the beacon device, and wherein the first location feature information is collected by the beacon device.

14. The mobile terminal of claim 11, wherein the instructions further cause the mobile terminal to be configured to obtain the registration location feature information based on a registration location feature table, and wherein the registration location feature table stores a correspondence between an identification of the beacon device and the registration location feature information.

15. The mobile terminal of claim 14, wherein the instructions further cause the mobile terminal to be configured to communicate with a server to receive the registration location feature table.

16. The mobile terminal of claim 11, wherein the instructions further cause the mobile terminal to be configured to:
   compare a first degree of matching between the first location feature information and the registration location feature information; and
   trigger neighbor awareness when the first degree of matching is greater than or equal to a first threshold.

17. The mobile terminal of claim 16, wherein the instructions further cause the mobile terminal to be configured to receive a registration label from the beacon device when the first degree of matching is greater than or equal to the first threshold, and wherein the registration label is configured to update the registration location feature information.

18. The mobile terminal of claim 11, wherein the instructions further cause the mobile terminal to be configured to obtain second location feature information, and wherein the second location feature information indicates an environmental condition around a current location of the mobile terminal.

19. The mobile terminal of claim 18, wherein the instructions further cause the mobile terminal to be configured to:
   compare a first degree of matching between the first location feature information and the registration location feature information;
   compare a second degree of matching between the second location feature information and the registration location feature information; and
   trigger neighbor awareness when the first degree of matching is greater than or equal to a threshold and when the second degree of matching is greater than or equal to a second threshold.

20. The mobile terminal of claim 18, wherein the instructions further cause the mobile terminal to be configured to:
   compare a first degree of matching between the first location feature information and the registration location feature information;
   compare a second degree of matching between the second location feature information and the registration location feature information; and
   forbid neighbor awareness when the first degree of matching is less than a first threshold and when the second degree of matching is less than a second threshold.

* * * * *